US006995792B1

(12) United States Patent  (10) Patent No.: US 6,995,792 B1
Ogura  (45) Date of Patent: Feb. 7, 2006

(54) CAMERA WITH POSITIONING CAPABILITY

(75) Inventor: Kazuo Ogura, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 731 days.

(21) Appl. No.: 09/667,390

(22) Filed: Sep. 20, 2000

(30) Foreign Application Priority Data

Sep. 30, 1999 (JP) ............................ 11-278677
Sep. 30, 1999 (JP) ............................ 11-278678
Oct. 25, 1999 (JP) ............................ 11-302451

(51) Int. Cl.
H04N 5/76 (2006.01)
(52) U.S. Cl. ............................ 348/231.99; 396/310
(58) Field of Classification Search .......... 348/231.99, 348/231.3, 116, 36; 396/310; 710/213; 342/357.06
See application file for complete search history.

(56) References Cited

U.S. PATENT DOCUMENTS

| 5,267,042 | A | * | 11/1993 | Tsuchiya et al. | ............. | 348/239 |
| 5,335,072 | A | * | 8/1994 | Tanaka et al. | ............. | 348/231.3 |
| 5,768,640 | A | * | 6/1998 | Takahashi et al. | ............ | 396/310 |
| 6,222,583 | B1 | * | 4/2001 | Matsumura et al. | ........ | 348/113 |
| 6,222,985 | B1 | * | 4/2001 | Miyake | ....................... | 348/144 |
| 6,304,729 | B2 | * | 10/2001 | Honda et al. | ............ | 348/231.99 |
| 6,351,613 | B2 | * | 2/2002 | Ohkado | ....................... | 396/303 |
| 6,437,797 | B1 | * | 8/2002 | Ota | ............................. | 345/638 |
| 6,507,371 | B1 | * | 1/2003 | Hashimoto et al. | ......... | 348/552 |

* cited by examiner

Primary Examiner—David L. Ometz
Assistant Examiner—Gevell Selby
(74) Attorney, Agent, or Firm—Frishauf, Holtz, Goodman & Chick, P. C.

(57) ABSTRACT

A positioning operation is performed to acquire a positioning result immediately before or immediately after a photographing instruction is given. GPS positioning is performed in response to a positioning start instruction (half depression of the shutter), after which the photographing instruction is issued. GPS positioning and photographing are carried out in order when an operation (full depression of the shutter) serves as both the photographing instruction and the positioning start instruction. When power is on, positioning is performed once and positioning information is held and stored in a saving memory in association with positioning information carried on a photographed image. Alternatively, photographing is performed first and when a power OFF switch is operated after the photographing operation is completed, positioning is performed and positioning information is stored in the saving memory in association with each photographed image. Immediately before series photographing is initiated, GPS positioning is performed and a positioning result is held, and after series photographing is finished, the positioning result is stored in a temporary memory in association with each of serially photographed images stored.

15 Claims, 27 Drawing Sheets

CAMERA WITH POSITIONING CAPABILITY

CROSS-REFERENCE TO RELATED APPLICATIONS

This application is based on Japanese Patent Applications No. 11-278677, filed Sep. 30, 1999; No. 11-278678, filed Sep. 30, 1999; and No. 11-302451, filed Oct. 25, 1999, the contents of which are incorporated herein by reference.

BACKGROUND OF THE INVENTION

The present invention relates to a camera with a positioning capability.

A positioning apparatus which is used in GPS(Global Positioning System)-based position determination (hereinafter called "GPS positioning apparatus") determines the current position (local position) based on positioning information sent from a plurality of GPS satellites. Such a GPS positioning apparatus is incorporated into an on-board navigation system or the like and is used to determine and display the local position (coordinates). Some GPS positioning apparatuses manufactured are of the size that can be installed into a wrist watch.

With such a small GPS positioning apparatus installed into a digital camera or a silver halide camera to measure the position of the camera, it is possible to, for example, automatically record the photographing location or the like in association with each photographed image. It is therefore expected that the utilization of the GPS positioning apparatus can further improve the usability or operability of cameras and contribute data collection by the cameras.

In this case where the GPS positioning apparatus is incorporated into, for example, a digital camera, however, when this GPS positioning apparatus is activated at the time the camera picks up an image, power consumed by the GPS positioning apparatus is added to power consumed by the drive system and image processing system of the camera in picking up the image. This requires a larger current than the current that is needed when the GPS positioning apparatus is not incorporated, thus significantly shortening the battery life.

Even when the GPS positioning apparatus is incorporated in a silver halide camera, power consumed by the GPS positioning apparatus is likewise added to power consumed by the drive system that is operated at the time of picking up an image (because the drive systems of recent silver halide cameras are electronically controlled). This case therefore also has a problem on a shorter battery life.

There is another shortcoming such that a noise component which is generated by the photographing process adversely influences the GPS positioning apparatus, so that positioning may not be performed properly.

In this case, one may incorporate the GPS positioning apparatus in a digital camera to acquire positional information of the digital camera every time a picture is taken, store the information as positional information of the photographed image and display the photographing location together with the photographed image at the time of reproducing the image. However, the time of positioning by the GPS positioning apparatus varies from about 1 second to about 10 seconds, depending on the positional relationship with GPS satellites as mentioned above or the reception environment. If a user tries to activate the GPS positioning apparatus to acquire positional information every time a picture is taken, the user may have to wait for about 10 seconds for each photographing and may not be able to take shots consecutively without much intervals. (A similar problem would occur when the GPS positioning apparatus is incorporated into a silver halide camera.)

Doing position determination every time photo-graphing takes place requires the same number of positioning actions as the number of shots or increases the load at the time of photographing. This leads to increased power consumption.

Some electronic cameras, such as a digital camera, is equipped with a so-called "series photographing capability" which continuously picks up a predetermined number of images over a predetermined time interval when a user depresses the shutter button once or keeps depressing it.

With a small GPS positioning apparatus installed into such a digital camera or a silver halide camera equipped with the series photographing capability to measure the position of the camera, it is possible to, for example, automatically record the photographing location or the like in association with each photographed image. It is therefore expected that the utilization of the GPS positioning apparatus can further improve the usability or operability of cameras and contribute data collection by the cameras.

In this case, one may incorporate the GPS positioning apparatus in a digital camera equipped with the series photographing capability to acquire positional information of the digital camera every time photographing takes place, store the information as positional information of the photographed image and display the photographing location together with the photographed image at the time of reproducing the image.

As mentioned above, however, the time of positioning by the GPS positioning apparatus varies from about 1 second to about 10 seconds, depending on the positional relationship with GPS satellites as mentioned above or the reception environment. If a user tries to activate the GPS positioning apparatus every time an image is picked up in the series photographing action to acquire positional information, the photographing time interval is likely to vary as in the following example. Even if series photographing takes place at the same photographing location, the positioning time may be changed by a change in the reception conditions, or if series photographing takes place while moving, the positioning time may be changed by due to the influence of the reception environment (the attenuation, reflection or the like of received radio waves caused by the landscape, buildings, etc.). If the user acquires positioning information every time a picture is taken and associates the positioning information with each photographed image (each of serially photographed images), the photographing time interval follows up the positioning time and is thus likely to vary.

Doing position determination every time photographing takes place requires the same number of positioning actions as the number of shots or causes the photographing manipulation and the positioning operation to overlap each other, thus increasing the load at the photographing time. This results in increased power consumption.

BRIEF SUMMARY OF THE INVENTION

Accordingly, it is an object of the present invention to provide a camera with a positioning capability which ensures a longer battery life and prevent a malfunction.

It is another object of this invention to provide a camera with a positioning capability which can reduce the positioning-operation originated load.

It is a further object of this invention to provide a camera and a photographing location memorizing method, which can reduce the load originated from a positioning operation at the time series photographing takes place.

To achieve the above objects, according to the first aspect of this invention, there is provided a camera comprising photographing means; positioning means; positioning timing control means for causing the positioning means to execute positioning at a predetermined timing to thereby obtain positional information; memory means for storing a plurality of images photographed by the photographing means; and memory control means for storing the positional information obtained by the positioning timing control means in the memory means in association with the plurality of photographed images.

According to the second aspect of this invention, there is provided a camera comprising photographing means having a series photographing capability, for acquiring image data of a subject; positioning means; timing control means for controlling a timing at which the positioning means executes positioning to obtain positional information; series photographing instruction means for giving a series photographing instruction to the photographing means to carry out series photographing; series photographing control means for performing such control as to cause the photographing means to execute series photographing to acquire a plurality of photographed images in response to the series photographing instruction given by the series photographing instruction means; memory means for storing the plurality of photographed images acquired under control of the series photographing control means; and memory control means for storing the positional information obtained by the positioning means in the memory means in association with the plurality of photographed images acquired by the photographing means.

According to the third aspect of this invention, there is provided a photographing location memorizing method for a camera having photographing means for acquiring image data of a subject, positioning means and a series photographing capability, comprising the steps of causing the positioning means to execute positioning at a predetermined timing to acquire positional information and causing the photographing means to carry out series photographing in response to a series photographing instruction; and storing a plurality of photographed images acquired by the series photographing and storing the positional information in association with the plurality of photographed images.

According to the fourth aspect of this invention, there is provided a camera comprising photographing means for acquiring image data of a subject; positioning means; and positioning timing control means for controlling the positioning means in such a way that positioning is carried out immediately before or immediately after photographing by the photographing means.

According to the fifth aspect of this invention, there is provided a camera comprising photographing means; positioning means; positioning timing control means for controlling the positioning means in such a way that positioning is carried out at a predetermined time interval; and positioning information acquisition means for acquiring the positioning information provided by the positioning means immediately before or immediately after photographing by the photographing means.

According to the sixth aspect of this invention, there is provided a camera comprising photographing means; positioning means; and control means for controlling a positioning operation by the positioning means and a photographing operation by the photographing means in such a way that a positioning timing of the positioning means and a photographing timing of the photographing means do not overlap each other.

According to this invention, as positioning is performed immediately before or immediately after photographing, the adverse influence on the GPS positioning apparatus or power consumption of the battery is minimized. As positioning is performed to acquire a positioning result before or after a photographing instruction is given, the photographing timing and the positioning timing do not overlap each other. This prevents the battery life from being significantly shortened.

As positioning is carried out when a positioning instruction is issued, the positioning operation need not be performed in response to the photographing instruction and can be performed at any location desired by a user. Further, as positioning is performed intermittently to acquire a positioning result immediately before or immediately after photographing, only the photographing operation should be performed in response to the photographing instruction. This relieves the burden put by the photographing instruction.

When the positioning operation and the photographing operation overlap each other, one of them can be carried out first with priority over the other so that such operational overlapping can be avoided (or consumption of a large current by the overlapping can be prevented). This can make the battery life longer. Because it is possible to previously set the priority of one of the positioning operation and the photographing operation higher than the priority of the other when overlapping of the positioning operation and the photographing operation occurs, an overlapping avoiding operation desired by a user can be executed. This makes the camera easier to use at the time of interval photographing, self-timer based photographing, interval positioning, positioning based on the positioning instruction or the like.

Further, as a photographed image obtained by the photographing operation can be stored in association with the positioning result obtained by the positioning operation, it is possible to further improve the usability of the camera and contribute data collection by the camera (data to be collected including not only image data and photographing date but also positional data or the like).

Furthermore, as positioning is carried out at a predetermined timing and the positioning result is adapted to a plurality of photographed images, the positioning-oriented load can be reduced. Generally, often is the case that with the motif being unchanged, the photographing position is not changed at the time of taking a picture but when the user wants to change the location, the camera is powered off during movement and photographing will start with a new motif. Even with single positioning carried out when the photographing mode is started, positional information associated with a photographed image matches with the actual photographing location in most cases. As mentioned above, the photographing location is often changed at the time of changing the motif. With the use of a camera designed to be able to select or set a folder, however, a folder is generally changed or newly provided at the time of changing the motif. This provides the following advantage in addition to the aforementioned advantages. In the case where the location is changed without turning off the camera and a picture is taken with the camera at the new location, positional information of the new location can be adapted to the photographed image.

The positional information that is acquired by a positioning operation can be stored in a saving memory in association with each photographed image. When a shutter manipulation is performed during positioning, the positioning is stopped and the held positioning result is stored in association with the photographed image. Therefore, the user can perform the shutter manipulation without being conscious or nervous about whether or not positioning is being carried out, except for the first positioning, so that the latest positioning result can be stored in association with each photographed image.

Positioning is carried out after a picture is taken and the photographed image is stored, and photographing is possible even during positioning so that when a picture is taken during positioning, the photographed image is stored in the memory, and after positioning timing is completed, the positioning result is stored in association with the photographed image currently stored (even with the image which has been picked up during positioning timing and has been stored). The user can therefore take pictures without being conscious of positioning timing at the time of photographing.

Positioning is performed after photographing and storing a photographed image are completed, the positioning result is associated with the photographed image, and when a next shutter manipulation is performed within a predetermined time after a previous shutter manipulation, the image that is picked up by the second shutter manipulation is stored in association with the positioning result so that the user can keep taking pictures without being conscious about positioning.

As positioning is executed at a predetermined timing and the positioning result is stored in association with a plurality of serially photographed images, it is possible to reduce the load originated from the positioning operation at the time of making series photographing. That is, because positioning is carried out before or immediately after a series photographing instruction is issued, the positioning operation and the series photographing operation do not overlap each other, making it possible to reduce the load originated from the positioning operation at the time of making series photographing. Further, because positioning is carried out immediately before or immediately after series photographing is completed, the user can perform series photographing without being conscious about positioning and the positioning operation and the series photographing operation do not overlap each other. Furthermore, positioning is performed both at the beginning and end of series photographing and positioning information which is interpolated for each of serially photographed images based on their positioning results can be used. This can make the adequate photographing location to be associated with each photographed image even in a case where the photographing location at the beginning of series photographing differs from the photographing location at the end of series photographing, such as a case of moving the camera to serially take pictures in responsive to the movement of a subject during series photographing or a case of serially taking pictures with a camera in motion like an on-board camera.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
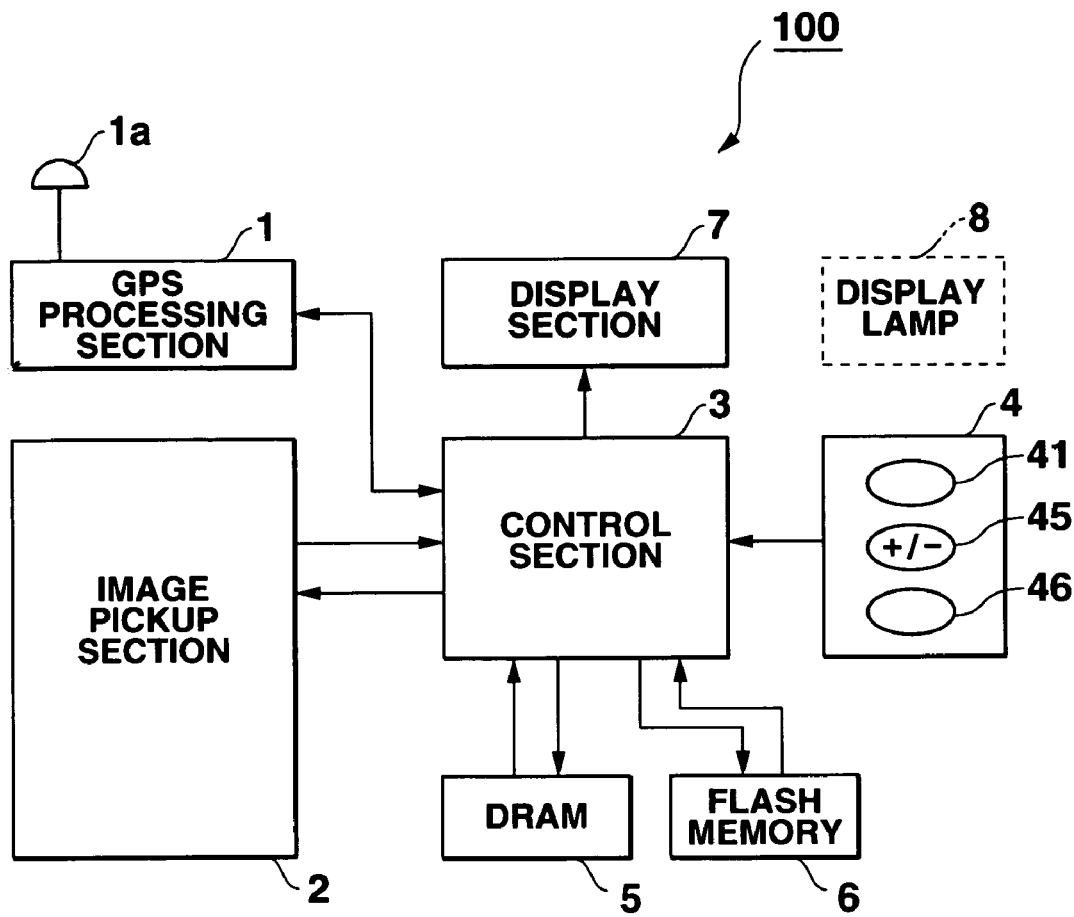
FIG. 1 is a block diagram illustrating the structure of one embodiment of a camera with a GPS positioning capability according to this invention.

FIG. 1 is a block diagram illustrating the structure of one embodiment of a camera with a GPS positioning capability according to this invention. A digital camera 100 has a GPS antenna 1a, a GPS processing section 1, an image pickup section 2, a control section 3, an operation section 4, a temporary memory (DRAM) 5, a saving memory (flash memory) 6, a display section 7 and an unillustrated power supply circuit. A warning display lamp 8 may be provided.

The GPS processing section (GPS positioning apparatus) 1 includes an RF circuit, an A/D converter, a data register, a counter, a decoder and a control section (microcomputer). The GPS processing section 1 amplifies and demodulate radio waves from a GPS satellite received at the GPS antenna 1a, decodes the acquired satellite data and performs position determination (positioning), such as computation of the local position of the digital camera 100, based on the decoded data. The positioning result from the GPS processing section 1 is sent to the control section 3 that performs the general control of the digital camera 100.

The image pickup section 2 converts the image of a subject into digital data, obtains signal components (hereinafter referred to as "image data"), such as a digital luminance signal and color difference multiplex signal (Y, Cb, Cr data), from the digital data and transfers the image data to the DRAM 5.

Figure 2:
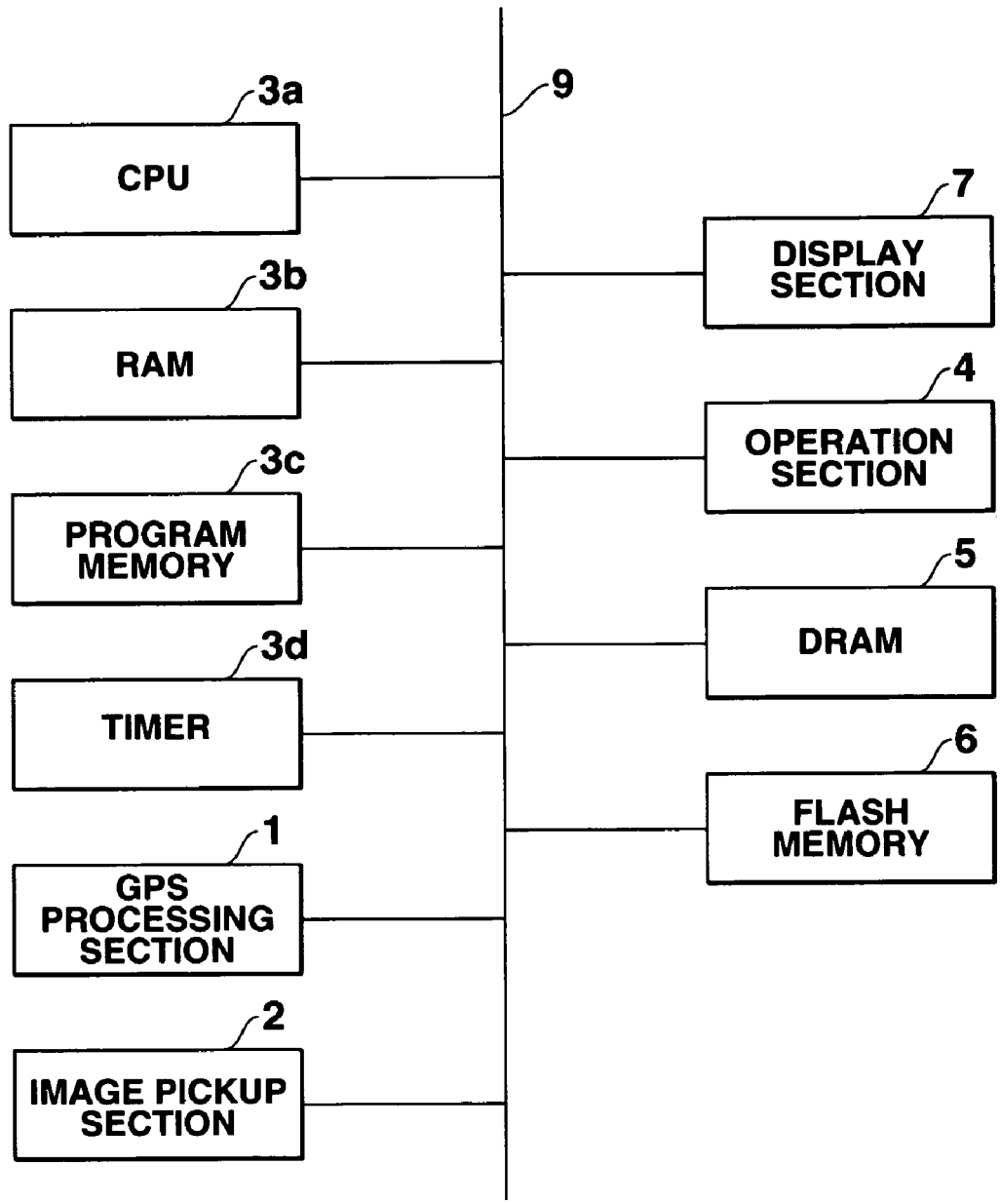
FIG. 2 is a block diagram illustrating the details of a control section shown in FIG. 1.

The control section 3 can be realized by a microprocessor which, for example, has peripheral circuits, such as a CPU 3a, RAM 3b, program memory 3c and timer 3d, as shown in FIG. 2. The CPU 3a is connected to the GPS processing section 1, the image pickup section 2, the display section 7, the operation section 4, the DRAM 5 and the flash memory 6 by a system bus 9. The CPU 3a performs the general control of the digital camera 100 according to a control program stored in the program memory 3c. Further, the CPU 3a loads programs for individual modes or a positioning timing control program at the time of photographing based on this invention from the program memory 3c in association with a state signal from the operation section 4, and executes and controls the individual functions of the digital camera 100. The program memory 3c is holding constants and menu data in addition to those programs.

When the shutter is fully depressed, the control section 3 reads image data from the DRAM 5, performs compression, such as JPEG compression, on the image data and stores the compressed data in the flash memory 6. At the time of data reproduction, the control section 3 expands the image data read from the flash memory 6 to restore the image data.

The operation section 4 includes a power ON/OFF switch 41, a plus/minus key 45, an unillustrated operation mode select switch and unillustrated function select buttons. When any of those keys and switches is operated, the operation section 4 sends a state signal to the control section 3.

Figure 3:
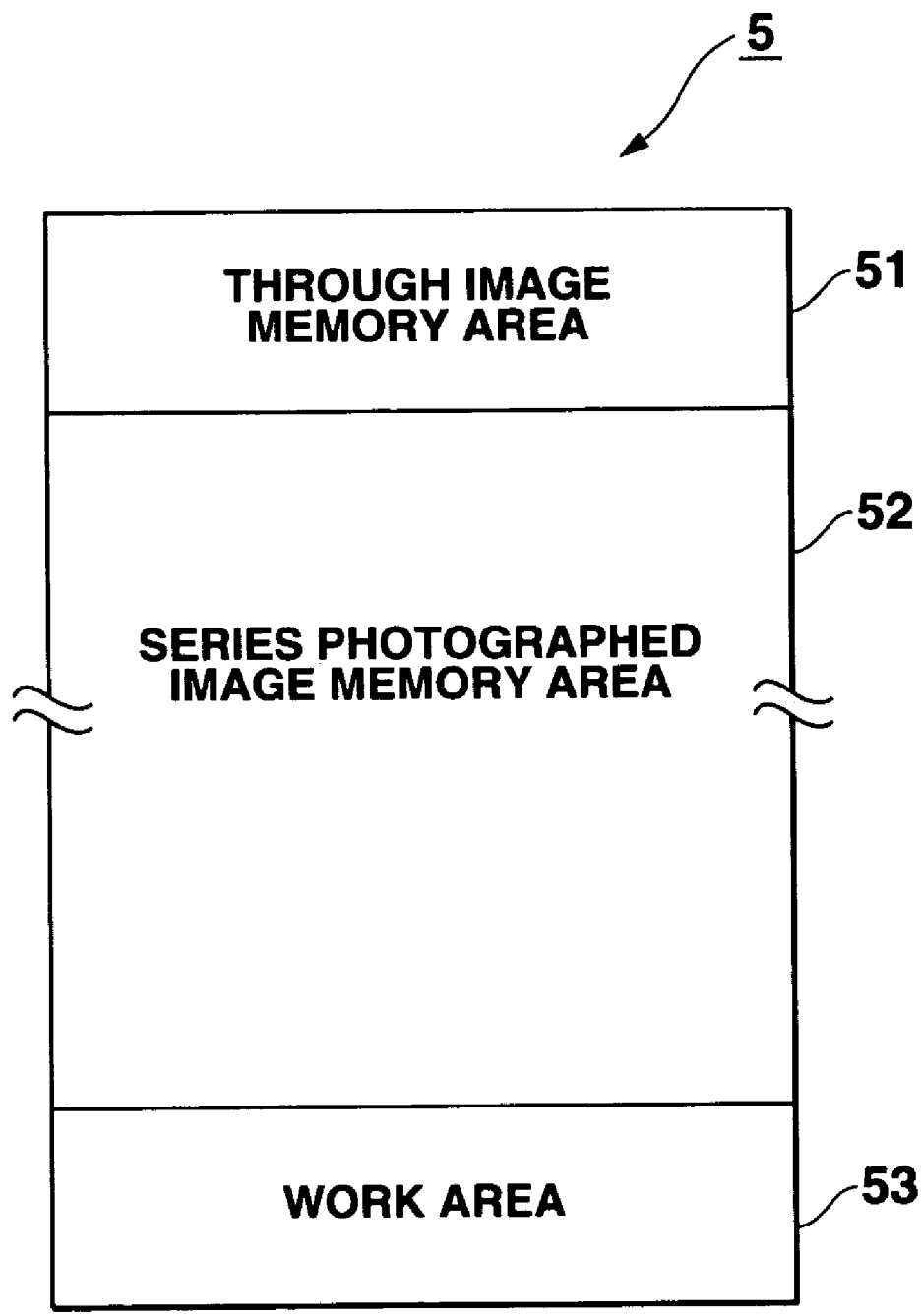
FIG. 3 is a diagram showing memory allocation of a DRAM shown in FIG. 1.

The DRAM 5 is used as a work memory and secures an image buffer area for temporarily storing a photographed image or a reproduced image, and a working area or the like which is used at the time of compression or expansion. In series photographing mode, the DRAM 5 secures a through image memory area 51 and a series photographed image memory area 52 capable of temporarily storing a predetermined number (e.g., 16) of subject images that are fetched at a predetermined time interval, as shown in FIG. 3. Further, a work area 53 is allocated in the DRAM 5. The flash memory 6 stores each photographed image.

[Positioning Timing Control Method at Photographing Time]

As mentioned above, when the photographing timing and the positioning timing overlap, a large current is needed, which shortens the battery life or malfunction. The digital camera 100 according to this invention is so designed as to make the photographing timing and the positioning timing different from each other, thus reducing the power consumption to elongate the battery life or prevent a malfunction.

When the photographing timing and the positioning timing overlap, photographing or positioning may be inhibited or positioning being in progress may be 9 indicated by the display lamp to thereby prevent the photographing timing and the positioning timing overlapping each other. The following will discuss several examples of the positioning timing control method at the photographing time.

Figure 4:
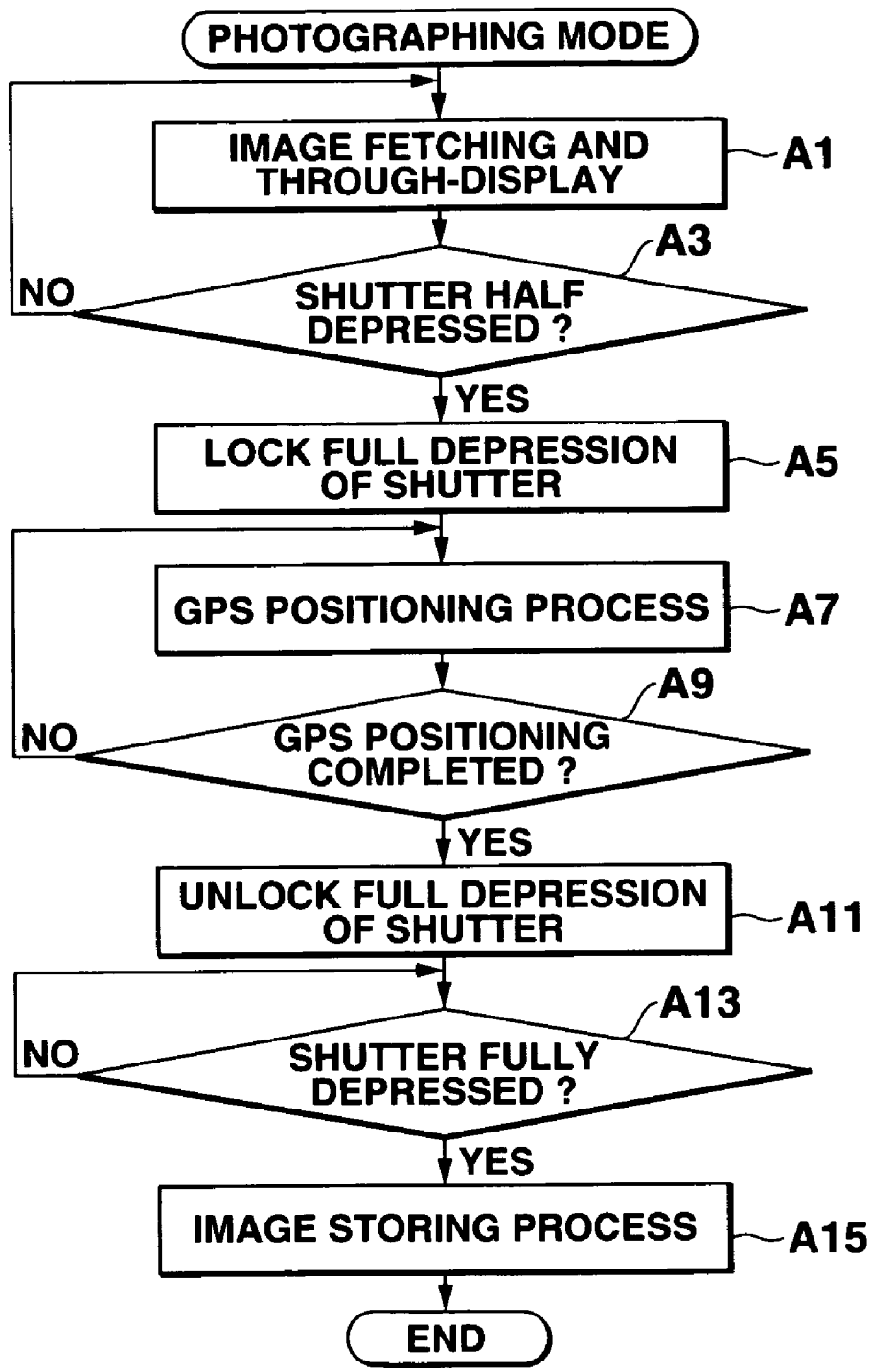
FIG. 4 is a flowchart illustrating a routine when positioning is performed immediately before photographing according to a first embodiment of this invention.

FIG. 4 is a flowchart illustrating a routine when positioning is performed immediately before photo-graphing.

In step A1 in FIG. 4, the control section 3 sets the digital camera 100 to a photographing mode, sequentially loads subject images (image data) from the image pickup section 2 into the DRAM 5 and performs through (finder) display of each photographed image on the display section 7.

Next, the control section 3 checks the state signal input from the operation section 4 to check if a shutter button 46 has been depressed half in step A3. When the shutter button 46 has not been depressed half, the control section 3 returns to step A1. When it is determined that the shutter button 46 has been depressed half, on the other hand, the control section 3 determines that there is a positioning start instruction and locks full shutter depression in step A5. Specifically, the control section 3 sets a prohibition flag for full shutter depression. Accordingly, even if a state signal corresponding to full shutter depression is input from the operation section 4, the control section 3 does not perform a process corresponding to full shutter depression. Although the half shutter depression operation is treated as the positioning start instruction in this embodiment, this is not restrictive. For example, a positioning start instructing function may be assigned to one of the function select buttons so that when this button is operated during the through-display in step A1 is considered as the positioning start instruction.

Next, the control section 3 executes a GPS positioning process in step A7. Specifically, the control section 3 sends a positioning start instruction signal to the GPS processing section 1 to start the GPS positioning process. When receiving the positioning start instruction signal, the GPS processing section 1 activates the GPS positioning apparatus to execute a reception process on radio waves received via the GPS antenna 1a, computes the local position (coordinates) of the digital camera 100 after the reception process and sends the positioning result (computed value) to the control section 3. After sending the positioning result (computed value) to the control section 3, the GPS processing section 1 proceeds to the next cycle of positioning (which means the next reception cycle of positioning information transmitted from a GPS satellite at every predetermined period).

Then, the control section 3 determines in step A9 whether or not the GPS positioning process has been completed. Upon reception of the positioning result from the GPS processing section 1, the control section 3 determines that positioning has been completed. When having determined in step A9 that the GPS positioning process has been completed, the control section 3 unlocks the lock (prohibition) of full shutter depression (sets the prohibition flag for full shutter depression) and proceeds to step A13.

In step A13, the control section 3 receives the state signal from the operation section 4 and determines if the shutter button 46 has been depressed fully. When it is determined that the shutter button 46 has been depressed fully, image data stored in the DRAM 5 is compressed and then stored in the flash memory 6 in step A15. At this time, the positioning result (positional data (coordinate values) of the digital camera 100) or the like acquired by the GPS positioning process in step A7 is also stored in association with the image data.

With the above-described structure, as one cycle of positioning is carried out to acquire a positioning result in response to the GPS positioning instruction which is given immediately before the photographing instruction in this embodiment, it is possible to prevent an adverse influence on the GPS processing section 1 and minimize the power consumption. Because full depression of the shutter button 46 is locked during the GPS positioning process, the photographing timing and the positioning timing do not overlap each other even when a photographing instruction is given during the positioning timing.

Figure 5:
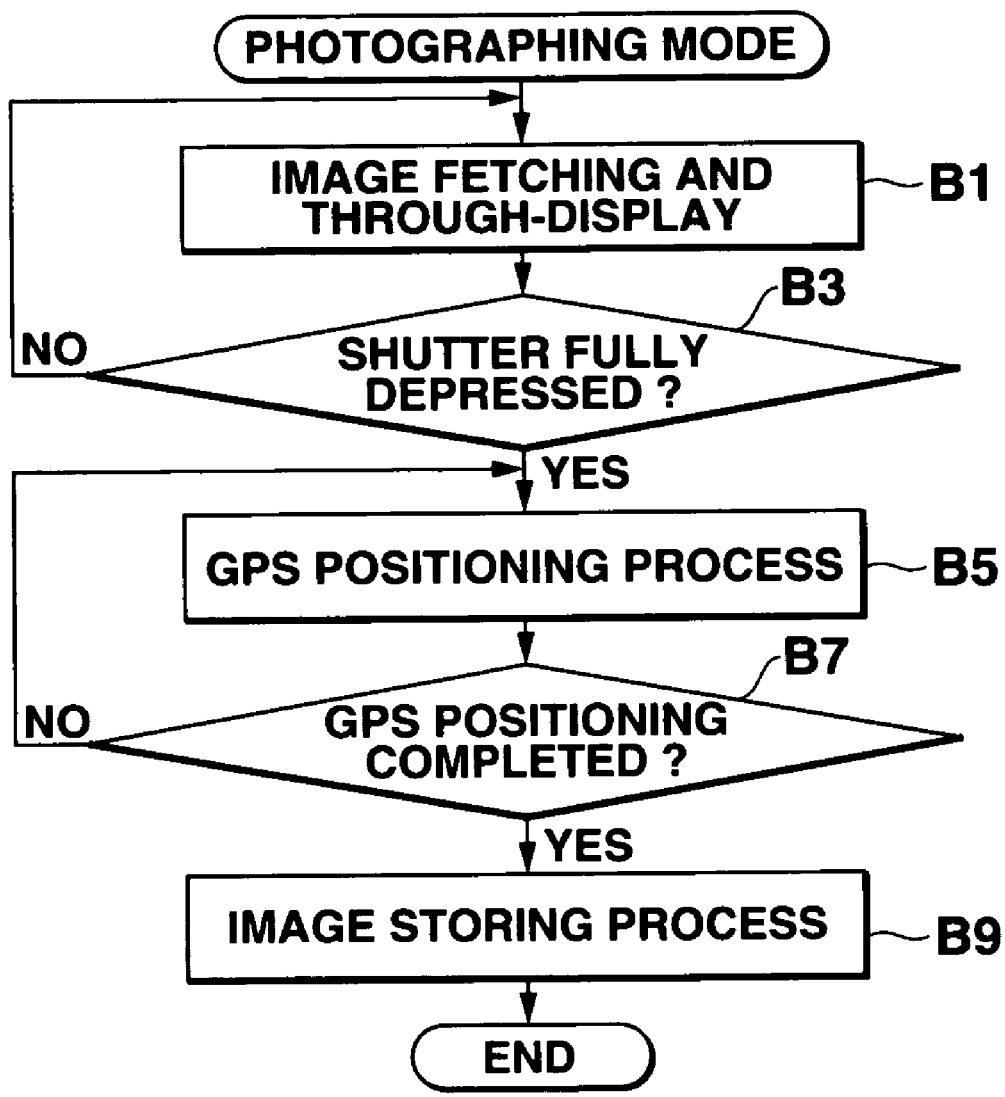
FIG. 5 is a flowchart illustrating another example of GPS positioning performed immediately before photographing.

FIG. 5 is a flowchart illustrating another example of GPS positioning performed immediately before photographing.

In step B1 in FIG. 5, the control section 3 sets the digital camera 100 to the photographing mode, sequentially loads subject images (image data) from the image pickup section 2 into the DRAM 5 and performs through-display of each photographed image on the display section 7.

Next, the control section 3 fetches the state signal from the operation section 4 to check if the shutter button 46 has been depressed fully in step B3. When it is determined that the shutter button 46 has been depressed fully, on the other hand, the control section 3 determines that there are a photographing instruction and a GPS positioning start instruction and proceeds to step B5.

In step B5, the control section 3 sends the positioning start instruction signal to the GPS processing section 1 to start the GPS positioning process. When receiving the positioning start instruction signal, the GPS processing section 1 activates the GPS positioning apparatus to execute a reception process on radio waves received via the GPS antenna 1a, computes the local position (coordinates) of the digital camera 100 and sends the positioning result (computed value) to the control section 3. After sending the positioning result (computed value) to the control section 3, the GPS processing section 1 proceeds to the next cycle of positioning (which means a process of the next received data from a GPS satellite).

Then, the control section 3 determines in step B7 whether or not the GPS positioning process has been completed. Upon reception of the positioning result from the GPS processing section 1, the control section 3 determines that positioning has been completed, and compresses image data stored in the DRAM 5 and then stores the compressed image data in the flash memory 6 in step B9. At this time, the positioning result acquired by the GPS positioning process in step B5 is also stored in association with the image data.

With the above-described structure, as one cycle of positioning is carried out to acquire a positioning result after the GPS positioning instruction is given in this embodiment, it is possible to prevent an adverse influence on the GPS processing section 1 and minimize the power consumption. Because an image storing process (photographing process) is performed after one cycle of GPS positioning process, the photographing timing and the positioning timing do not overlap each other.

Figure 6:
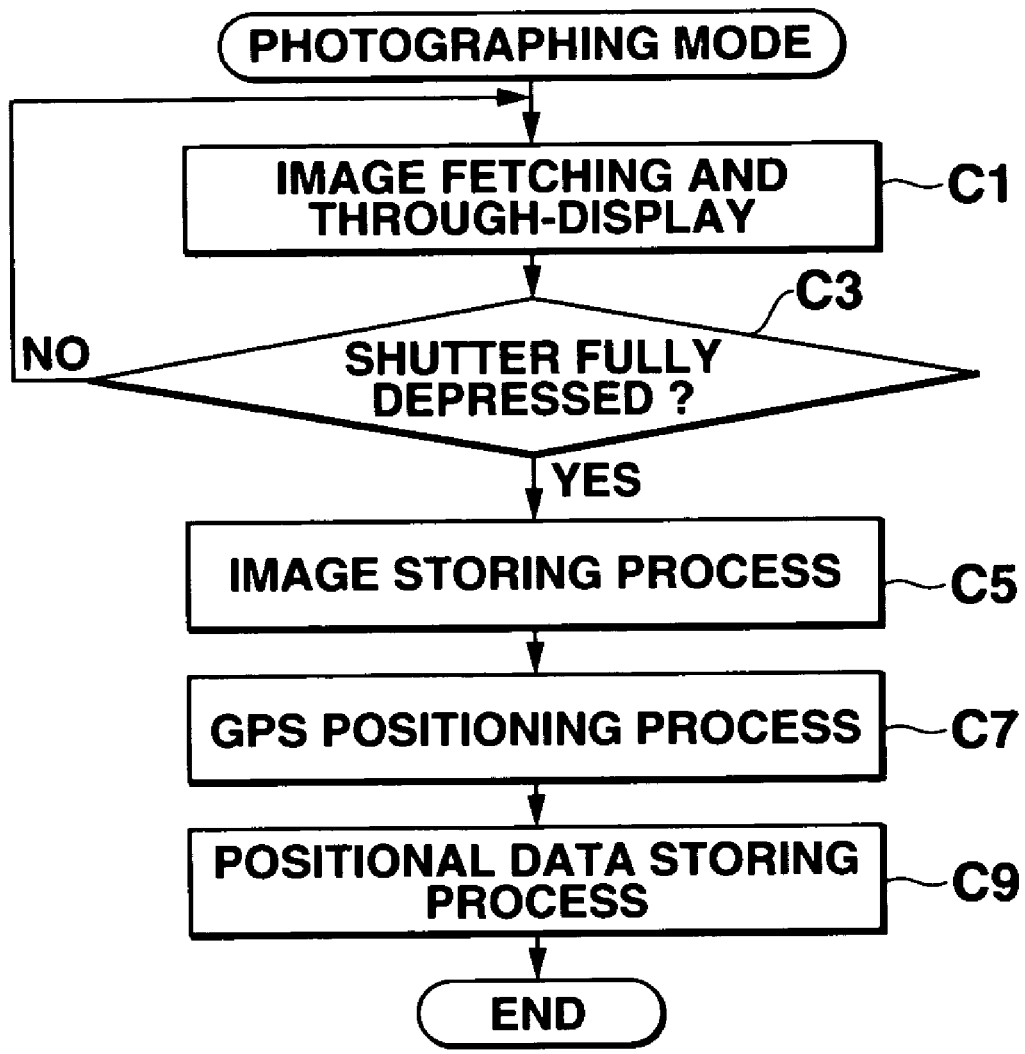
FIG. 6 is a flowchart illustrating a routine when GPS positioning is performed immediately after photographing.

FIG. 6 is a flowchart illustrating a routine when GPS positioning is performed immediately after photographing.

In step C1 in FIG. 6, the control section 3 sets the digital camera 100 to the photographing mode, sequentially loads subject images (image data) into the DRAM 5 and performs through-display of each photographed image on the display section 7.

Next, the control section 3 fetches the state signal input from the operation section 4 to check if the shutter button 46 has been depressed fully in step C3. When it is determined that the shutter button 46 has been depressed fully, the control section 3 determines that there are a photographing instruction and a GPS positioning start instruction and proceeds to step C5.

In step C5, the control section 3 compresses the photographed image stored in the DRAM 5 and stores the compressed image data in the flash memory 6.

In the next step C7, the control section 3 sends the positioning start instruction signal to the GPS processing section 1 to start the GPS positioning process. When receiving the positioning start instruction signal, as mentioned above, the GPS processing section 1 computes the local position (coordinates) of the digital camera 100 and sends the positioning result (computed value) to the control section 3.

Then, in step C9, the control section 3 stores the positioning result received from the GPS processing section 1 in step C7 in the flash memory 6 in association with the photographed image (image data) stored in the flash memory 6 in the photographing operation in the step C5.

With the above-described structure, as one cycle of positioning is carried out to acquire a positioning result after a picture is taken in this embodiment, it is possible to prevent an adverse influence on the GPS processing section 1 and minimize the power consumption. Because an image storing process (photographing process) is performed after one cycle of GPS positioning process, the photographing timing and the positioning timing do not overlap each other.

Figure 7:
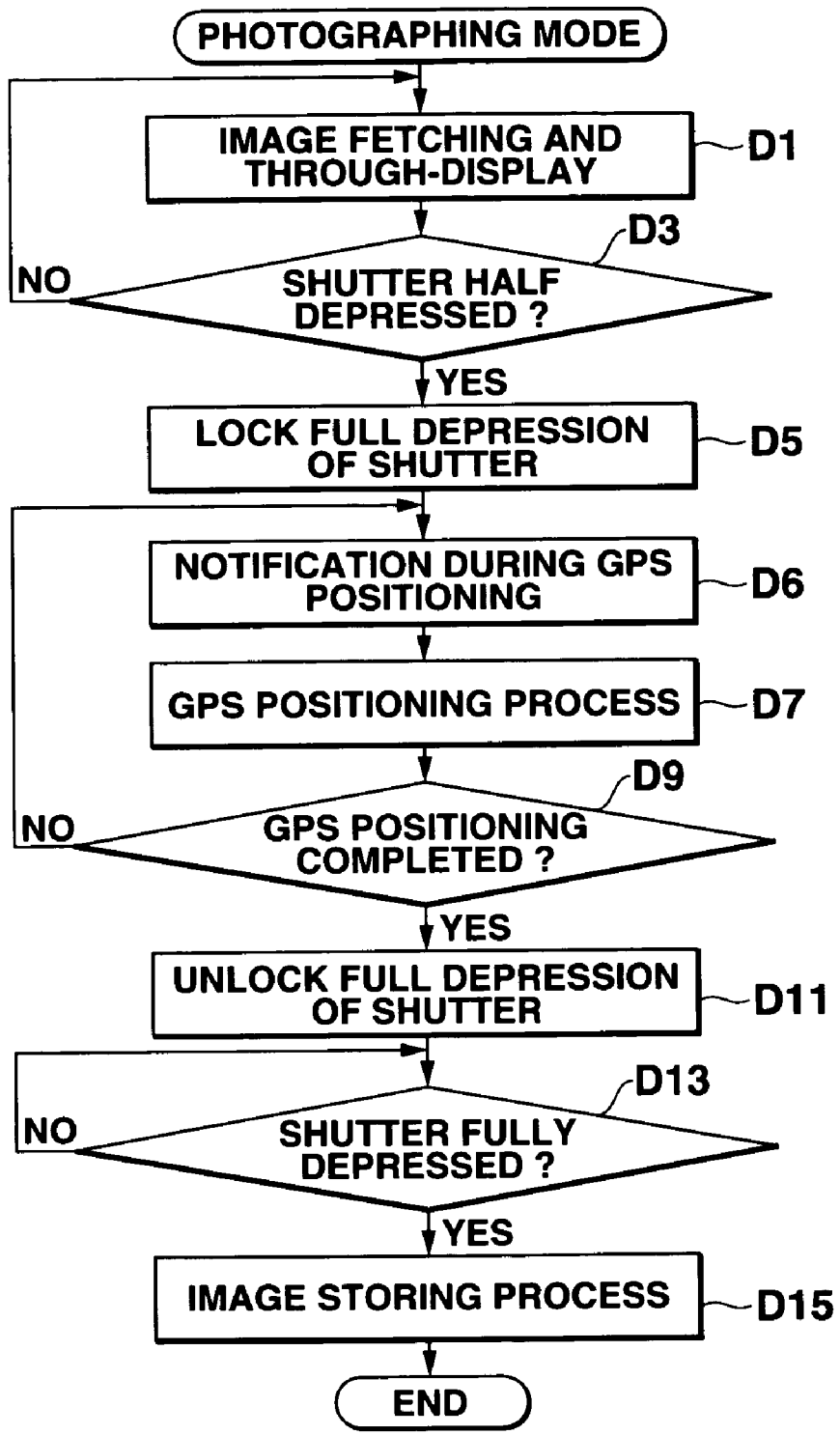
FIG. 7 is a flowchart showing a routine to notify that GPS positioning is in progress.

FIG. 7 is a flowchart showing a routine to notify that GPS positioning is in progress.

As processes in steps D1 to D5 and D9 to D15 in FIG. 7 are similar to those in steps A1 to A5 and A9 to A15 in FIG. 4, their description will be omitted. As shown in FIG. 7, when determining the half shutter depression in step D3, the control section 3 notifies the user of GPS positioning being in progress in step D6. Specifically, for example, the display lamp 8 is lit (or flickered) or a buzzer sound is generated. This structure may eliminate the need for locking of the full depression of the shutter button 46 in step D5 and unlocking of the full shutter depression in step D11.

Although the photographing process is to store a photographed image in the memory in the examples shown in FIGS. 4 through 6, the photographing process may be the process of the image pickup section (image pickup process) in the case where a camera which uses an optical finder and does not display a through image is designed to operate the image pickup section only when the photographing instruction is given.

The photographing process may be lens driving or image processing for an AF (Auto Focus) operation, lens driving for a zooming operation or a strobe emission process for strobe photographing.

Figure 8:
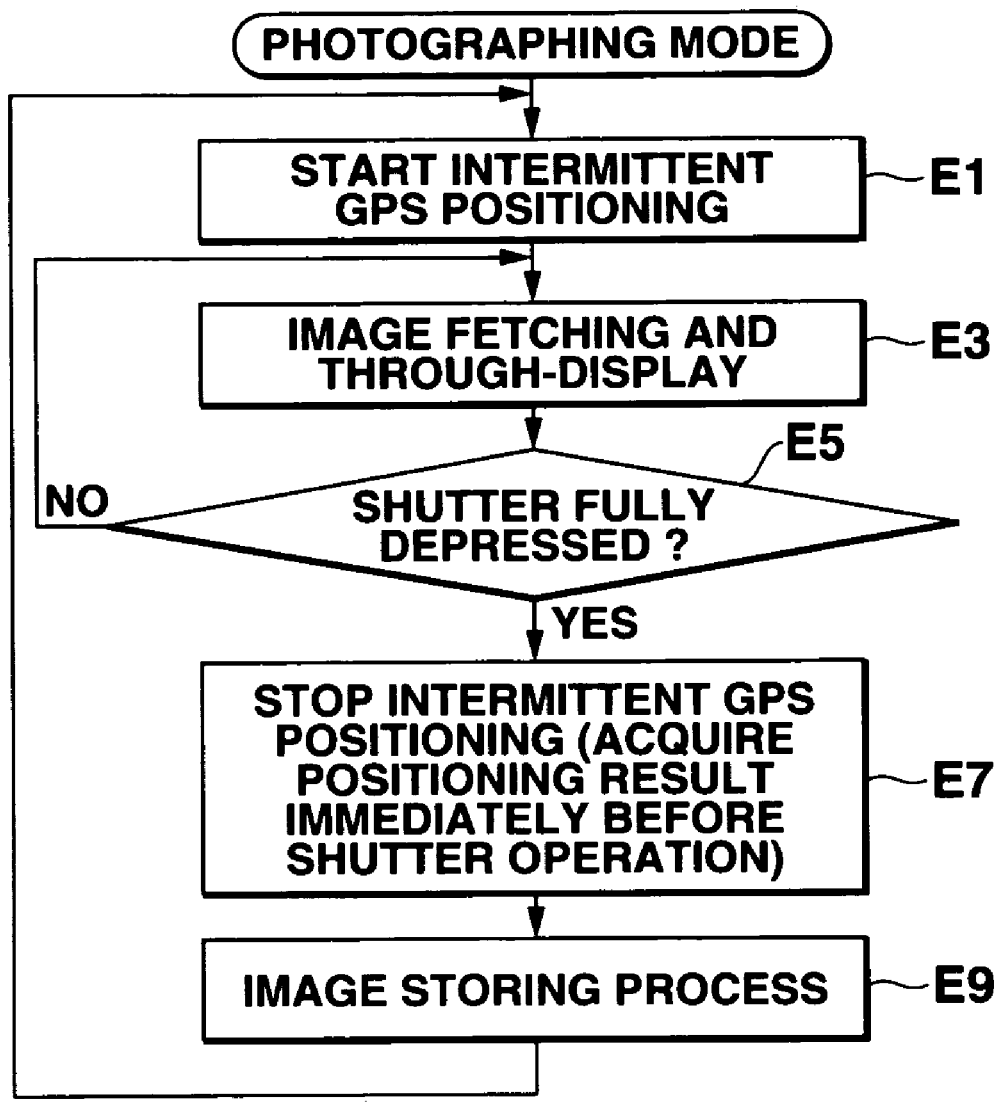
FIG. 8 is a flowchart showing a routine in the case of acquiring the result of positioning immediately before photographing by intermittently executing GPS positioning.

FIG. 8 is a flowchart showing a routine in the case of acquiring the result of positioning immediately before photographing by intermittently executing GPS positioning.

In this embodiment, a GPS positioning process is carried out at every predetermined time interval (hereinafter referred to as "intermittent positioning") to acquire the positioning results before and after photographing.

In step E1 in FIG. 8, the control section 3 sets the digital camera 100 to the photographing mode, and sends the positioning start instruction signal to the GPS processing section 1 to start the intermittent GPS positioning process. When receiving the positioning start instruction signal, the GPS processing section 1 activates the GPS positioning apparatus at every designated time to execute a reception process on radio waves received via the GPS antenna 1a, computes the local position (coordinates) of the digital camera 100 and sends the positioning result (computed value) to the control section 3. The control section 3 overwrites the content of a positioning result memory area in the RAM 3b (or DRAM 5) with the positioning result received from the GPS processing section 1. (Though not illustrated, this intermittent GPS positioning process is carried out by the GPS processing section 1 at every predetermined time interval between steps E1 to E7.)

In the next step E3, the control section 3 loads subject images (image data) into the DRAM 5 and performs through-display of each photographed image on the display section 7. When the intermittent GPS positioning process is performed during this period, the image loading and through-display process and the intermittent positioning process may be executed in parallel, but image loading may be stopped to suppress overlapping processes and be resumed after the intermittent GPS positioning process is completed. (An image before stopping the image loading may be displayed directly or a message or a mark indicating that positioning is in progress may be displayed on the display section 7.)

Next, the control section 3 fetches the state signal input from the operation section 4 to check if the shutter button 46 has been depressed fully in step E5. When it is determined that the shutter button 46 has been depressed fully, the control section 3 sends a positioning stop instruction signal to the GPS processing section 1 after giving the photographing instruction, thus stopping the intermittent GPS positioning process.

Accordingly, the result of the intermittent GPS positioning process that has been executed at the closest timing to the photographing instruction is stored in the RAM 3b (or DRAM 5).

In the next step E9, the control section 3 performs compression on the photographed image stored in the DRAM 5 and stores the compressed image data as a photographed image in the flash memory 6. At this time, the positioning result (positional data (coordinate values) of the digital camera 100) acquired by the GPS positioning process is stored in association with the photographed image (image data), after which the flow returns to step E1 to resume the intermittent GPS positioning process.

The order of the processes in steps E7 and E9 may be reversed. That is, when the shutter button 46 is depressed fully in step E5, the result (positioning result) of the intermittent GPS positioning process that has been executed at the closest timing to the photographing instruction may then be stored in association with the photographed image, after which the positioning result after the photographing instruction (before the photographing process) may be acquired. (In this case, intermittent positioning may not be stopped.)

Figure 9:
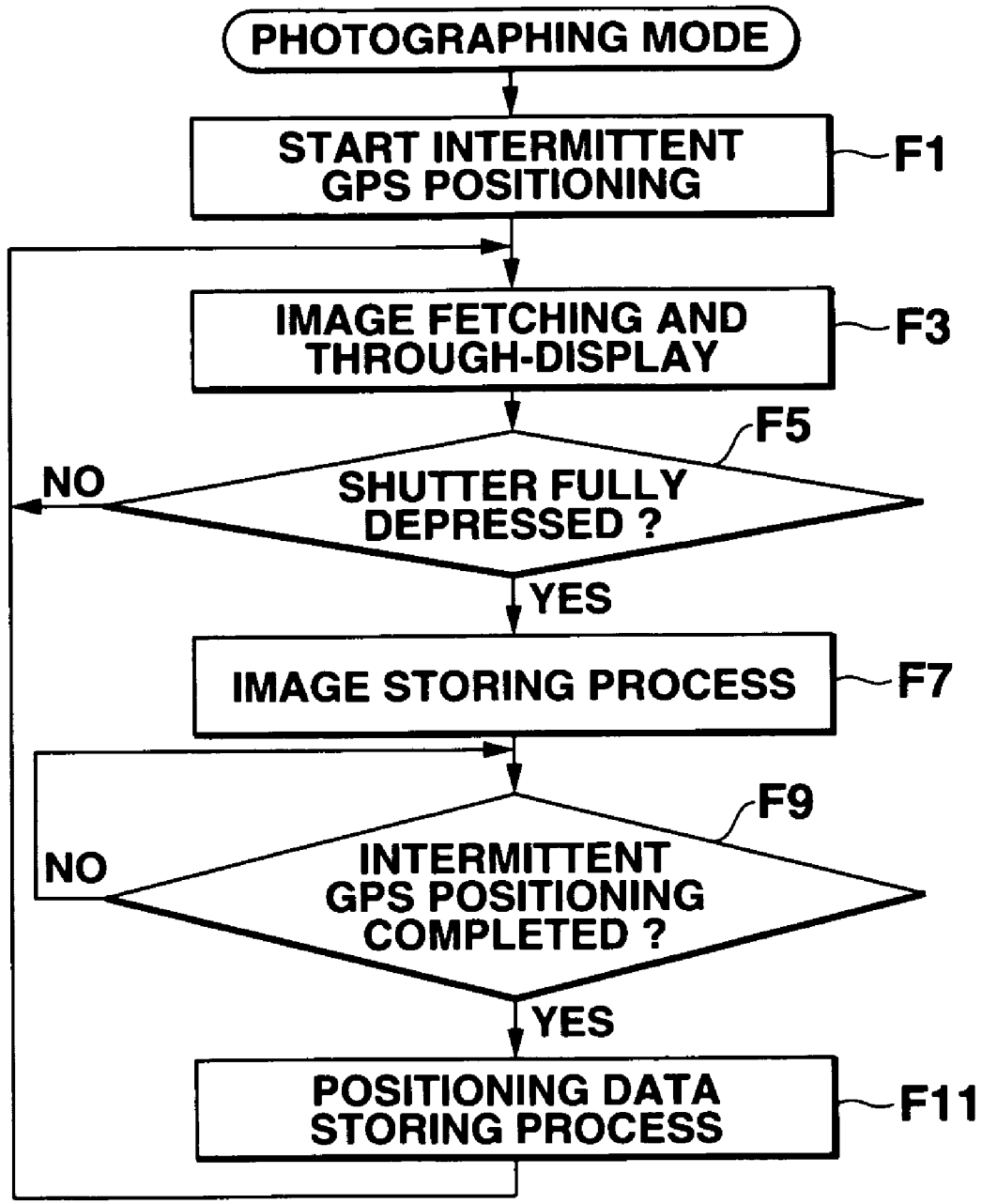
FIG. 9 is a flowchart showing a routine in the case of acquiring the result of positioning immediately after photographing.

FIG. 9 is a flowchart showing a routine in the case of acquiring the result of positioning immediately after photographing.

As processes in steps F1, F3 and F5 in FIG. 9 are similar to those in steps E1, E3 and E5 in FIG. 8, their description will be omitted. After the shutter button 46 is fully depressed to instruct photographing in step F5 in FIG. 9, the control section 3 compresses image data stored in the DRAM 5 and stores the data as a photographed image in the flash memory 6.

Then, in step F9, the control section 3 checks the state signal of the GPS processing section 1 to determine whether or not the GPS processing section 1 has completed the intermittent GPS positioning process. When determining that the intermittent GPS positioning process has been finished, the control section 3 stores the positioning result received from the GPS processing section 1 in association with the photographed image (image data) stored in the flash memory 6 in step F11.

According to this embodiment with the above-described structure, the result of GPS positioning that has been performed intermittently immediately after photographing is acquired. This makes the adverse influence on the GPS processing section 1 and the power consumption of the battery smaller.

At the time the result of the intermittent GPS positioning process as illustrated in FIGS. 8 and 9 is acquired, the photographing timing and the positioning timing may overlap each other.

Figure 10:
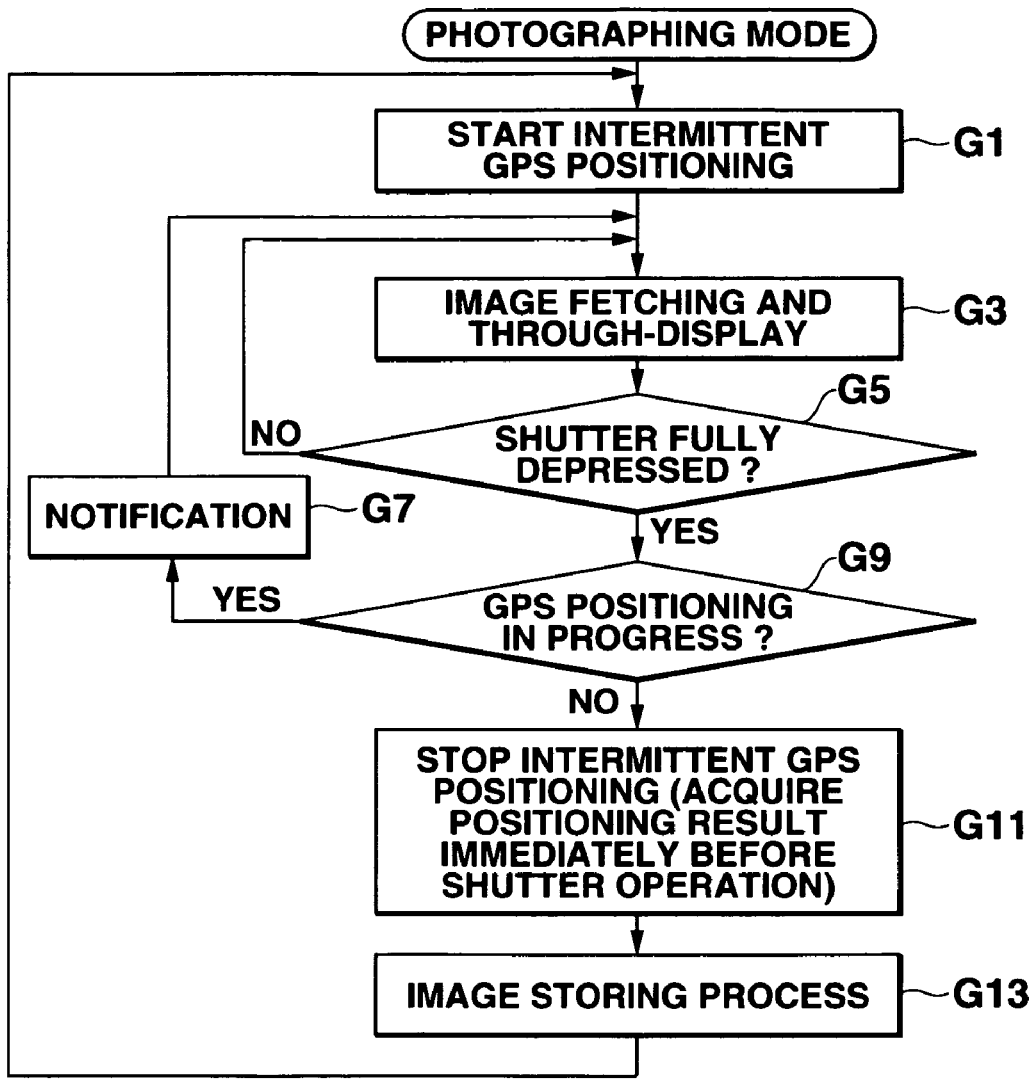
FIG. 10 is a flowchart illustrating a routine in the case of inhibiting photographing until overlapping of GPS intermittent positioning and a photographing operation is gone in order to prevent such overlapping.

FIG. 10 is a flowchart illustrating a routine in the case of inhibiting photographing until overlapping of GPS intermittent positioning and a photographing operation is gone in order to prevent such overlapping.

As processes in steps G1 and G3 in FIG. 10 are similar to those in steps F1 and F3 in FIG. 9, and their description will be omitted.

When determining in step G5 that the shutter button 46 has been depressed fully, as illustrated in the diagram, the control section 3 checks the state signal of the GPS processing section 1 to determine whether or not the GPS processing section 1 is in operation in step G9. When the GPS processing section 1 is in operation, the control section 3 determines that GPS positioning is in progress and turns on or flickers the display lamp 8 in step G7 to inform the user of positioning being in progress. The digital camera 100 may be provided with a sound output device to notify "positioning in progress" by a sound or voice.

Figure 11:
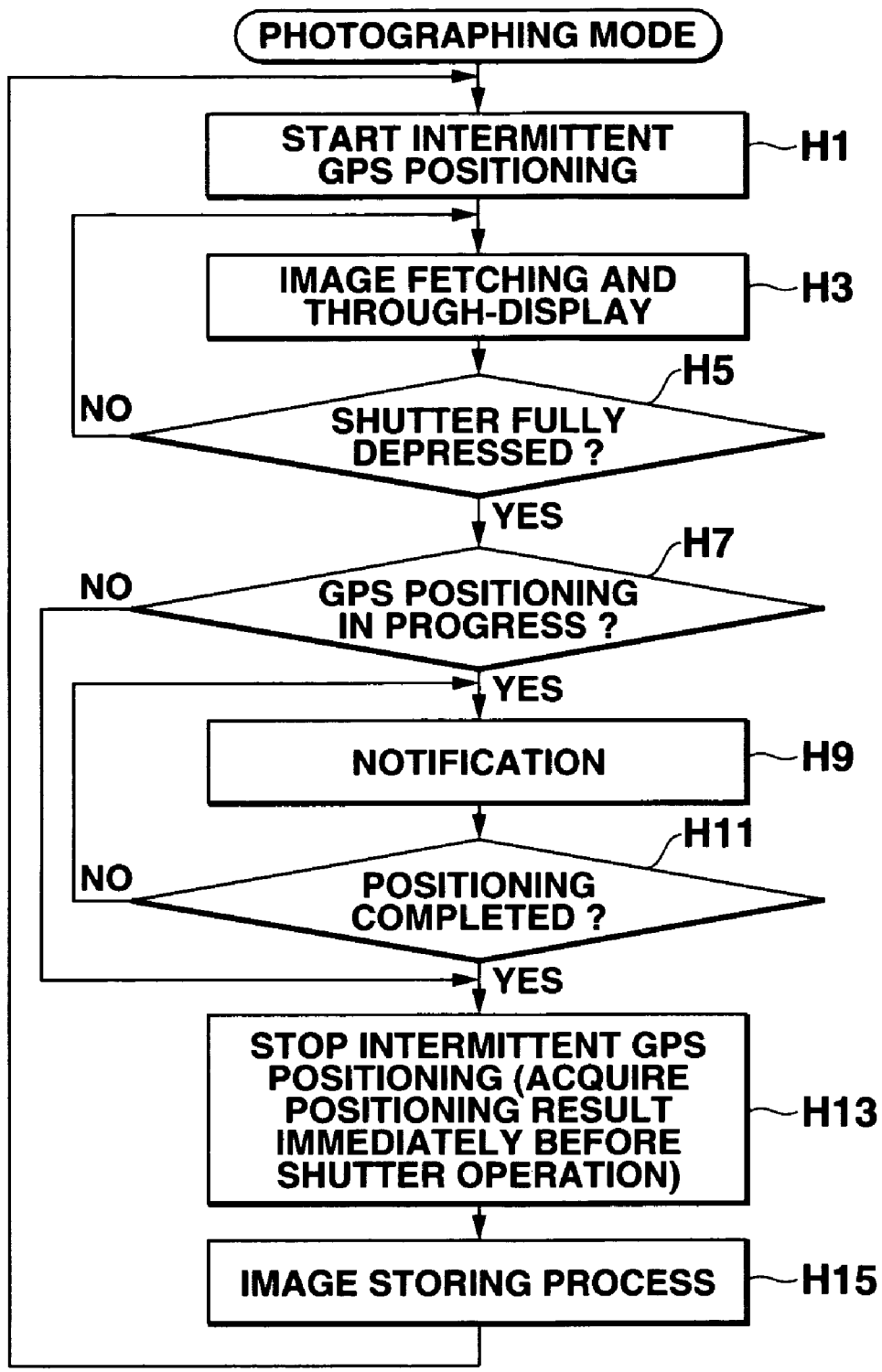
FIG. 11 is a flowchart illustrating a routine when photographing takes place after positioning is finished.

FIG. 11 is a flowchart illustrating a routine when photographing takes place after positioning is finished.

As processes in steps H1 and H3 in FIG. 11 are similar to those in steps F1 and F3 in FIG. 9, their description will be omitted.

When the control section 3 checks the state signal input from the operation section 4 and determines that the shutter button 46 has been depressed fully in step H5, as illustrated in the diagram, the control section 3 checks the state signal of the GPS processing section 1 to determine if the GPS processing section 1 is in operation in step H7. When the GPS processing section is in operation, the control section 3 determines that GPS positioning is in progress (intermittent GPS positioning process being in progress) and turns on (or flickers) the display lamp 8 in step G7 to inform the user of positioning being in progress. The digital camera 100 may be provided with a sound output device to notify "positioning in progress" by a sound or voice.

In the next step H11, the control section 3 determines if positioning is completed. Specifically, because the GPS processing section 1 stops positioning for a predetermined time after sending the positioning result (computed value) to the control section 3 until a control signal (positioning start instruction signal) is sent from the control section 3, the control section 3, upon reception of the positioning result from the GPS processing section 1, determines that one cycle of intermittent positioning has been completed, and proceeds to step H13. The subsequent steps H13 and H15 perform similar processes to those in steps G11 and G13 in FIG. 10.

When the positioning timing comes during a photographing process (image storing process in the embodiment), the positioning process may be executed after interrupting the photographing process. In this case, after the positioning process (intermittent positioning) is completed, the interrupted photographing process may be restarted.

Figure 12:
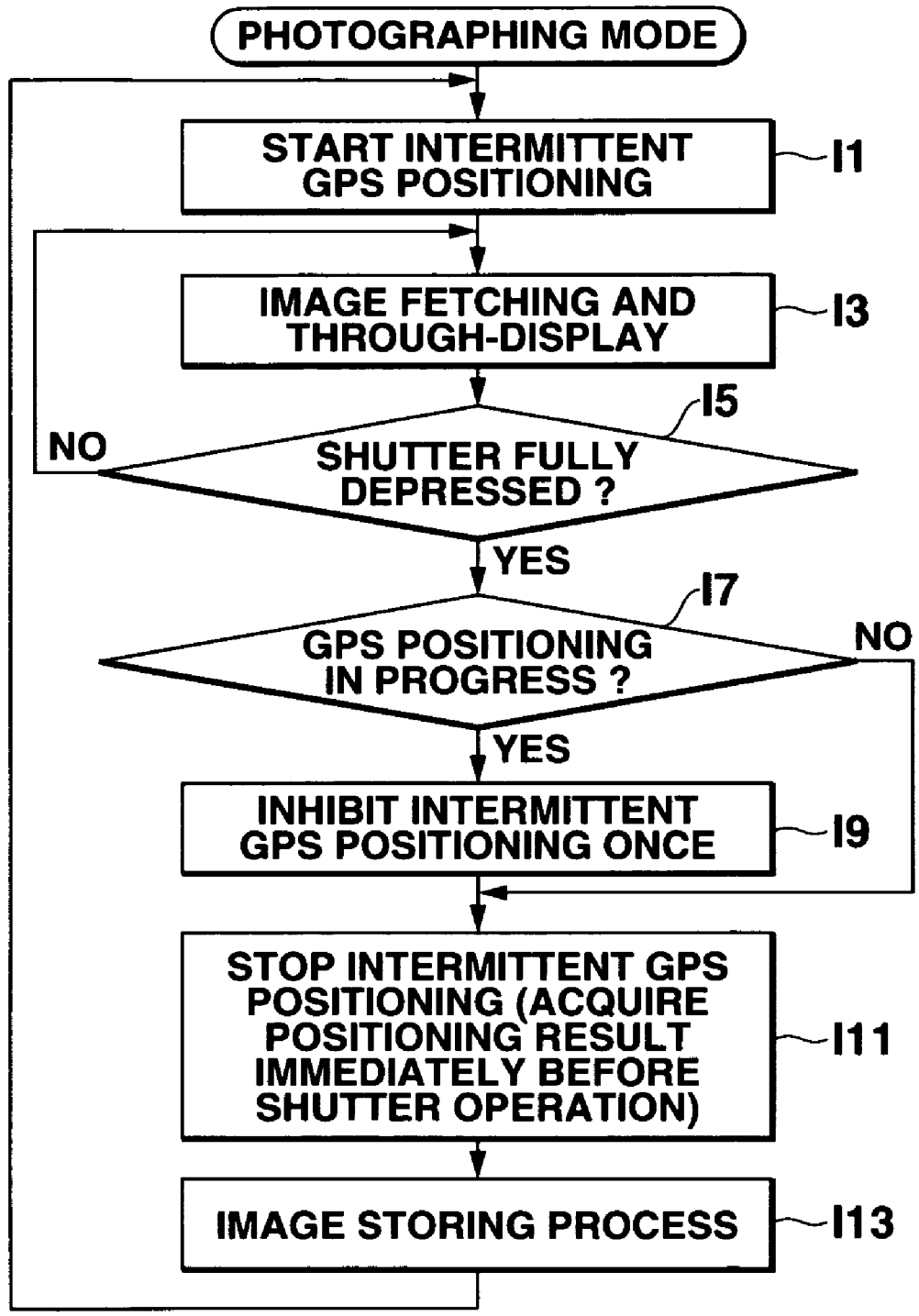
FIG. 12 is a flowchart showing a routine in the case where intermittent positioning is stopped and photographing is performed with priority over positioning.

FIG. 12 is a flowchart showing a routine in the case where intermittent positioning is stopped and photographing is performed with priority over positioning.

As processes in steps I1 and I3 in FIG. 12 are similar to those in steps F1 and F3 in FIG. 9, their description will be omitted.

In step I5 in FIG. 12, the control section 3 checks the state signal from the operation section 4 to determine if the shutter button 46 has been depressed fully. When full depression of the shutter button 46 is determined, the control section 3 checks the state signal from the GPS processing section 1 in step I7. When the GPS processing section 1 is in operation, the control section 3 determines that GPS positioning is in progress (intermittent GPS positioning process in progress) and goes to step I9.

In step I9, the control section 3 sends a control signal to the GPS processing section 1 to inhibit intermittent GPS positioning once until the current intermittent GPS positioning time elapses. (That is, the current GPS positioning is stopped.) The subsequent steps I11 and I13 perform similar processes to those in steps H13 and H15 in FIG. 11.

When a predetermined time elapses after the intermittent GPS positioning process in steps I5 to I9 is inhibited, the next intermittent GPS positioning process is executed, and the positioning result of the inhibited intermittent GPS positioning process previous by one cycle can be obtained in step I11. In the case of acquiring the positioning result immediately after photographing shown in FIG. 9, the next intermittent GPS positioning process can be executed when a predetermined time passes after prohibition of the intermittent GPS positioning process in step I9. It is therefore possible to prohibit intermittent GPS positioning once when the photographing instruction is issued and acquire the positioning result.

Note that the inhibited positioning process may be carried out after the photographing process is completed. When the positioning timing comes during the photographing process, the positioning process may be prohibited or the positioning process may be executed after the photographing process is completed.

According to this embodiment with the above-described structure, it is determined upon operation of the shutter button 46 whether or not the intermittent GPS positioning process is in progress, and a priority-to-positioning process or a priority-to-photographing process can be executed automatically. Even when the photographing instruction is issued during the positioning timing or the positioning timing comes during photographing, therefore, the photographing timing and the positioning timing do not overlap each other.

Figure 13:
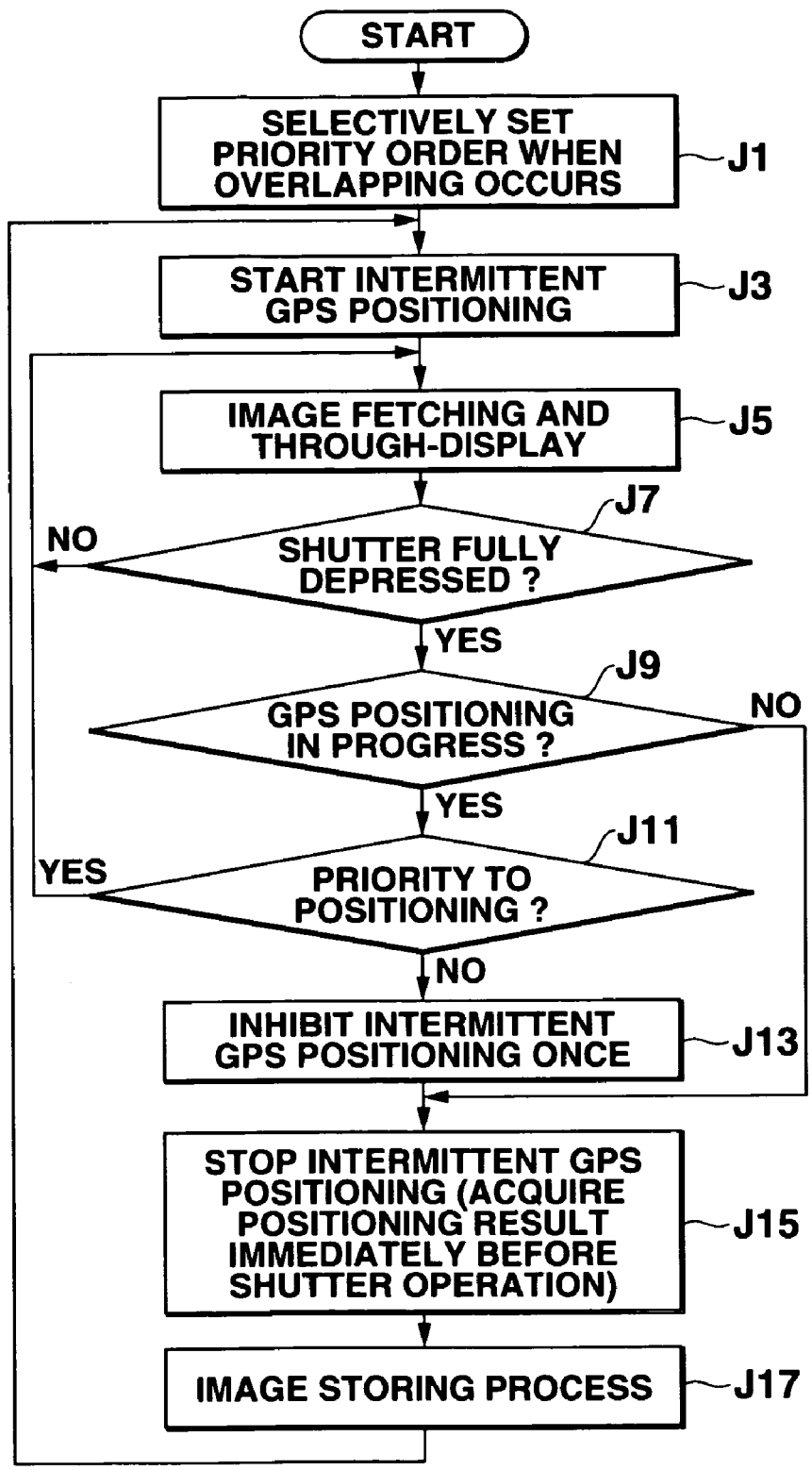
FIG. 13 is a flowchart showing a control operation in the case where a user selectively sets a priority to positioning or to photographing before photographing and a priority-to-positioning process or a priority-to-photographing is performed according to the result of the selective setting when the photographing timing and GPS intermittent positioning timing overlap each other.

FIG. 13 is a flowchart showing a control operation in the case where a user selectively sets a priority to positioning or to photographing before photographing and a priority-to-positioning process or a priority-to-photographing is performed according to the result of the selective setting when the photographing timing and GPS intermittent positioning timing overlap each other.

When the photographing mode is activated, the control section 3 sends a priority operation select message (or mark) at the time the photographing timing and the positioning timing overlaps to the display section 7 and displays the message on the display screen in step J1, requesting the user of the proper selection. When the user manipulates a key (e.g., the plus key 45) to select the priority operation, the control section 3 stores the selected setting value (e.g., "0" for priority to positioning and "1" for priority to photographing) into the RAM 3b (or DRAM 5).

When determining full depression of the shutter button 46 in step J7 in FIG. 13, the control section 3 checks the state signal of the GPS processing section 1 in step J9. When the GPS processing section 1 is in operation, the control section 3 determines that GPS positioning is in progress (intermittent GPS positioning process in progress) and goes to step J11.

In step J11, the control section 3 checks the selected setting value set in the step J1 and returns to step J5 when the value indicates priority to positioning (set value="0") but proceeds to step J13 when the value indicates priority to photographing (set value="1").

The control section 3 sends a control signal to the GPS processing section 1 to prohibit the intermittent GPS positioning process once until the current intermittent positioning time elapses (the current GPS positioning is stopped) and proceeds to step J15.

When the intermittent GPS positioning process is in progress in the step J9, the display lamp 8 may be lit or flickered to inform the user of that event.

When a predetermined time elapses after the intermittent GPS positioning process is inhibited, the next intermittent positioning process is executed in the step J13 in which the positioning result of the inhibited intermittent GPS positioning process previous by one cycle can be obtained. In the case of acquiring the positioning result immediately after photographing shown in FIG. 9, the next intermittent GPS positioning process can be executed when a predetermined time passes after prohibition of the intermittent GPS positioning process in the step J13. It is therefore possible to prohibit intermittent GPS positioning once when the photographing instruction is issued and acquire the positioning result.

Although the foregoing description referring to FIGS. 10 to 13 has been given of the case where when the positioning timing and the photographing timing overlap each other at the time of executing the intermittent GPS positioning operation shown in FIGS. 8 and 9, the photographing inhibition (priority to positioning) control or the positioning termination (priority to photographing) control is performed, the photographing inhibition (priority to positioning) control or the positioning termination (priority to photographing) control is not limited to the examples illustrated in FIGS. 8 and 9. For example, such control may be adapted when selective setting of the priority operation is performed or at the time of performing interval photographing, automatic photographing based on a self-timer or the like, or positioning based on the positioning instruction in the example of FIG. 4.

Because this embodiment with the above-described structure selectively sets the priority operation when the positioning timing and the photographing timing overlap each other at the time of at the time of carrying out photographing or positioning, and executes a priority to positioning process or a priority to photographing process in accordance with the result of the selective setting, the photographing timing and the positioning timing do not overlap each other.

Although the GPS processing section 1 goes to the next cycle of positioning after sending the positioning result (computed value) to the control section 3 in the foregoing description of the individual examples, a modification may be made in such a way that after executing one cycle of positioning and sending the positioning result to the control section 3, the GPS processing section 1 interrupts the positioning process or stops the positioning process until an instruction is given from the control section 3.

The second embodiment of this invention will be described below.

If positioning is performed and the positioning result is adapted to a photographed image every time a picture is taken as described above, the positioning operation should be executed each time. The second embodiment is so designed as to adapt positioning information acquired at a predetermined timing to a plurality of photographed images. The adaptation of positioning information may be accomplished by two schemes: one is to store the same positioning information in association with each photographed image in one to one correspondence and the other is to associate one positioning information with a plurality of photographed images and display the positioning information in association with each image at the time of reproduction. The following will discuss several examples of the positioning timing control and the operation of adapting positioning information to photographed images.

Figure 14:
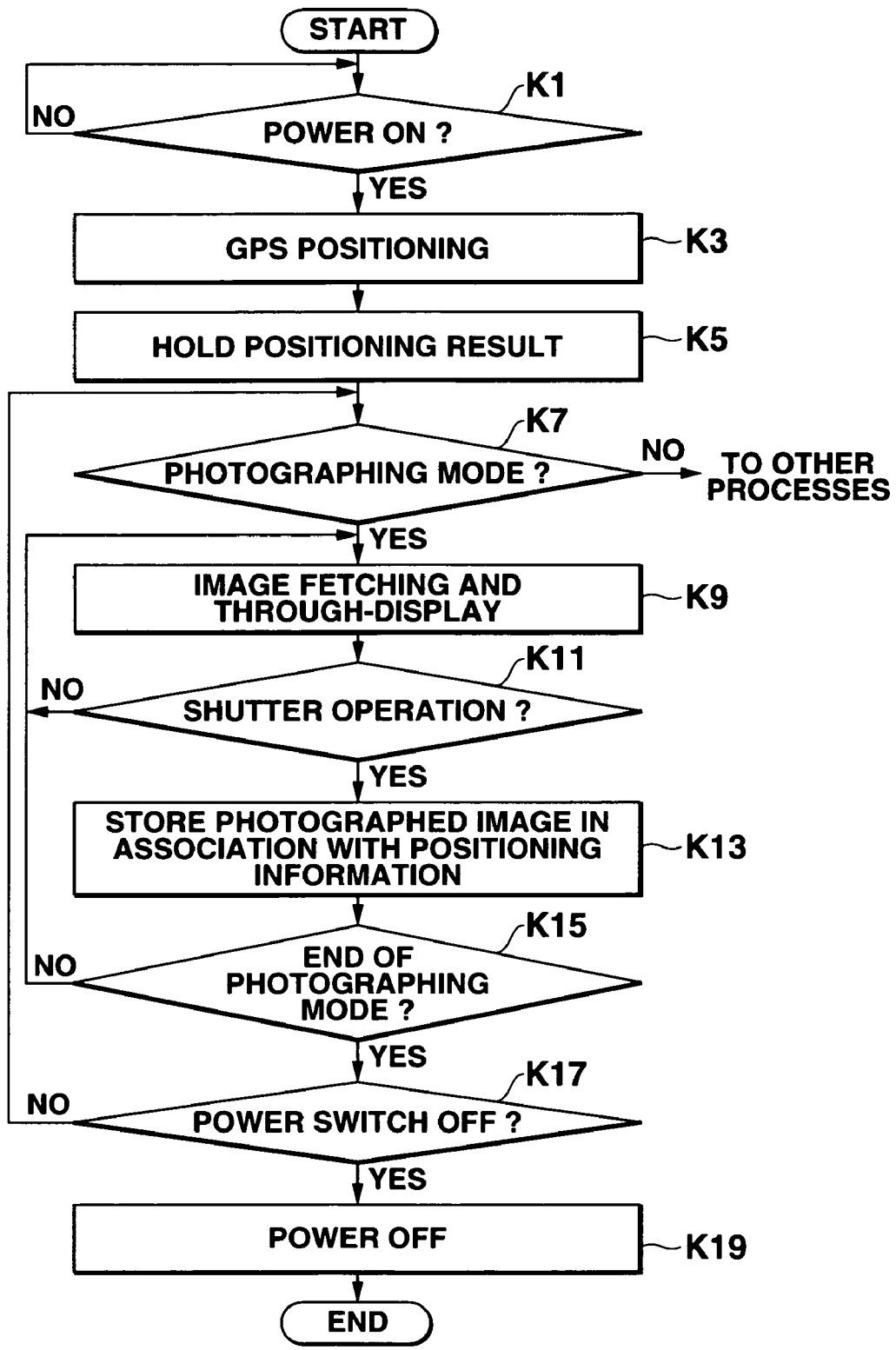
FIG. 14 is a flowchart illustrating a routine in the case where positioning is performed when the camera is powered on according to a second embodiment of this invention.

FIG. 14 is a flowchart illustrating a routine in the case where positioning is performed when the camera is powered on according to a second embodiment of this invention.

In step K1 in FIG. 14, the control section 3 checks a power supply state flag to determine if power is on. When power is on, the control section 3 sends a control signal to the GPS processing section 1 and then proceeds to step K3.

When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3 in step K3. After completing one cycle of positioning, the GPS processing section 1 proceeds to the next cycle of positioning (which means the next reception cycle of positioning information transmitted from a GPS satellite at every predetermined period), so that when receiving the positioning result from the GPS processing section 1, the control section 3 sends a positioning end instruction signal to the GPS processing section 1 to prevent the GPS processing section 1 from going to the next cycle and stop positioning.

Next, the control section 3 stores the positioning result (positioning information) received from GPS processing section 1 into the positioning result memory area in the RAM 3b (or DRAM 5) in step K5.

In the next step K7, the control section 3 reads process mode select menu data (or icon data) or the like from the program memory 3c and sends the data to the display section 7 and displays it on the screen, prompting the user to make a selection.

The control section 3 checks the state signal sent from the operation section 4. When the selected processing mode is the photographing mode, the control section 3 goes to step K9. Although step K7 is positioned after steps K3 and K5 in this embodiment, step K7 may be executed before steps K3 and K5.

In step K9, the control section 3 sends a control signal to the image pickup section 2 to fetch a subject image. The image pickup section 2 stores the subject image (image data) into the DRAM 5 via an optical system. The fetched image is also subjected to through-display on the display section 7.

Next, the control section 3 checks the state signal sent from the operation section 4 in step K11. When it is determined that the shutter button 46 has been depressed fully, the control section 3 determines that there is a photographing instruction and proceeds to step K13.

In step K13, the control section 3 performs compression on the photographed image stored in the DRAM 5 and stores the compressed image data (as a photographed image) in the flash memory 6. At this time, the positioning result (positioning information (position data (coordinate values) of the digital camera 100)) stored in the RAM 3b in step K5 is stored in association with the photographed image.

In the next step K15, the control section 3 checks the state signal from the operation section 4 to determine if there has been an operation to terminate the current photographing mode. When such a termination operation has been performed, the control section 3 proceeds to step K17. When the termination operation is not performed even after a predetermined time passes, the control section 3 returns to step K3 to perform an operation of acquiring the next image.

In step K17, the control section 3 checks the state signal from the operation section 4 to determine if there has been an operation to turn off the power switch. When the power OFF operation has been performed, the control section 3 turns off the power and terminates the routine in step K19. When the power OFF operation is not performed even after a predetermined time passes, the control section 3 returns to step K7 to perform an operation of displaying the selection menu for the next processing mode.

With the above-described structure, positioning is executed when the camera is powered on and the positioning result is saved in association with individual photographed images that have been picked up until the camera is powered off. Therefore, the GPS positioning process has only to be executed once at the time the camera is powered on, so that the user can perform the shutter manipulation without being conscious about positioning (because the user needs not wait for positioning to be completed). With the motif being unchanged, generally, the photographing position is not changed at the time of taking a picture but when the user wants to change the location, the camera is powered off during movement and photographing will start (the camera is powered on) with a new motif. Even with single positioning performed when the camera is powered on, positional information associated with a photographed image matches with the actual photographing location in most cases.

Figure 15:
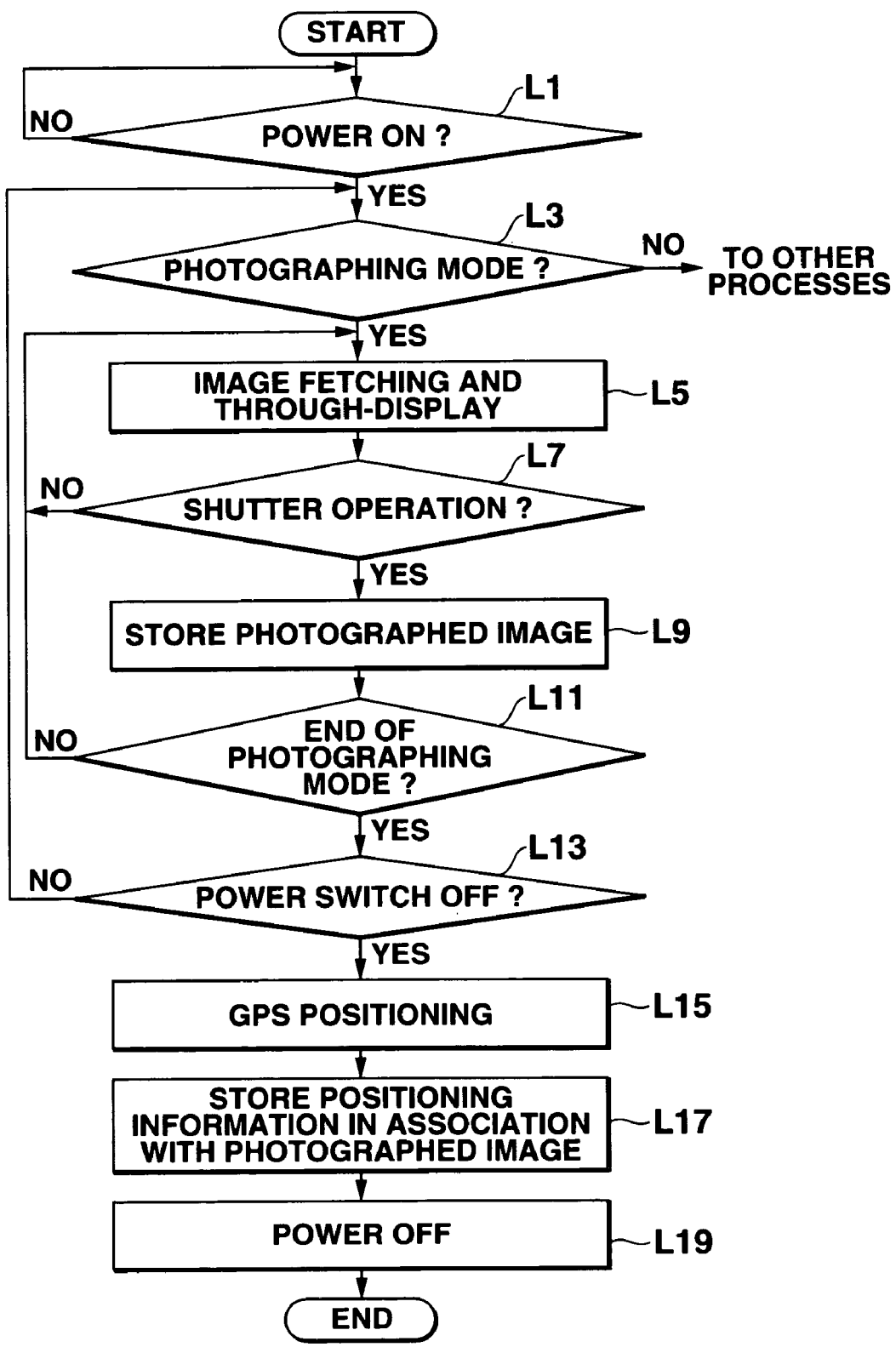
FIG. 15 is a flowchart illustrating a routine in the case where GPS positioning is performed when the camera is powered off.

FIG. 15 is a flowchart illustrating a routine in the case where GPS positioning is performed when the camera is powered off.

In step L1 in FIG. 15, the control section 3 checks the power supply state flag to determine if power is on. When power is on, the control section 3 proceeds to step L3.

In step L3, the control section 3 reads process mode select menu data (or icon data) or the like from the program memory 3c and sends the data to the display section 7 and displays it on the screen, prompting the user to make a selection.

The control section 3 checks the state signal sent from the operation section 4. When the selected processing mode is the photographing mode, the control section 3 goes to step L5.

In step L5, the control section 3 sends a control signal to the image pickup section 2 to fetch a subject image. The image pickup section 2 stores the subject image (image data) into the DRAM 5 via the optical system. The fetched image is also subjected to through-display on the display section 7.

Next, the control section 3 checks the state signal sent from the operation section 4 in step L7. When it is determined that the shutter button 46 has been depressed fully, the control section 3 proceeds to step L9.

In step L9, the control section 3 performs compression on the photographed image stored in the DRAM 5 and stores the compressed image data in the flash memory 6.

In the next step L11, the control section 3 checks the state signal from the operation section 4 to determine if there has been an operation to terminate the current photographing mode. When such a termination operation has been performed, the control section 3 proceeds to step L13. When the termination operation is not performed even after a predetermined time passes, the control section 3 returns to step L5 to execute an operation of acquiring the next image and performing through-display of the image.

In step L13, the control section 3 checks the state signal from the operation section 4 to determine if there has been an operation to turn off the power switch. When the power OFF operation has been performed, the control section 3 sends a control signal to the GPS processing section 1 and then goes to step L15.

When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3 in step L15. After completing one cycle of positioning, the GPS processing section 1 proceeds to the next cycle of positioning, so that when receiving the positioning result from the GPS processing section 1, the control section 3 sends a positioning end instruction signal to the GPS processing section 1 to prevent the GPS processing section 1 from going to the next cycle and stop positioning.

In step L17, the control section 3 stores the positioning result received from GPS processing section 1 in the step L15 in association with the individual photographed images (image data) stored in the flash memory 6 in the photographing operation of the steps L5 to L11. The control section 3 then turns off the power in step L19.

With the above-described structure, positioning is executed when a series of photographing actions is completed and the camera is powered off and the positioning result is saved in association with individual photographed images that have been picked up during the power ON duration. This can allow the user to take pictures without being conscious about positioning. With the motif being unchanged, generally, the photographing position is not changed at the time of taking a picture but when the user wants to change the location, the camera is powered off during movement and photographing will start (the camera is powered on) with a new motif. Even with single positioning performed when the camera is powered off, positional information associated with a photographed image matches with the actual photographing location in most cases.

Figure 16:
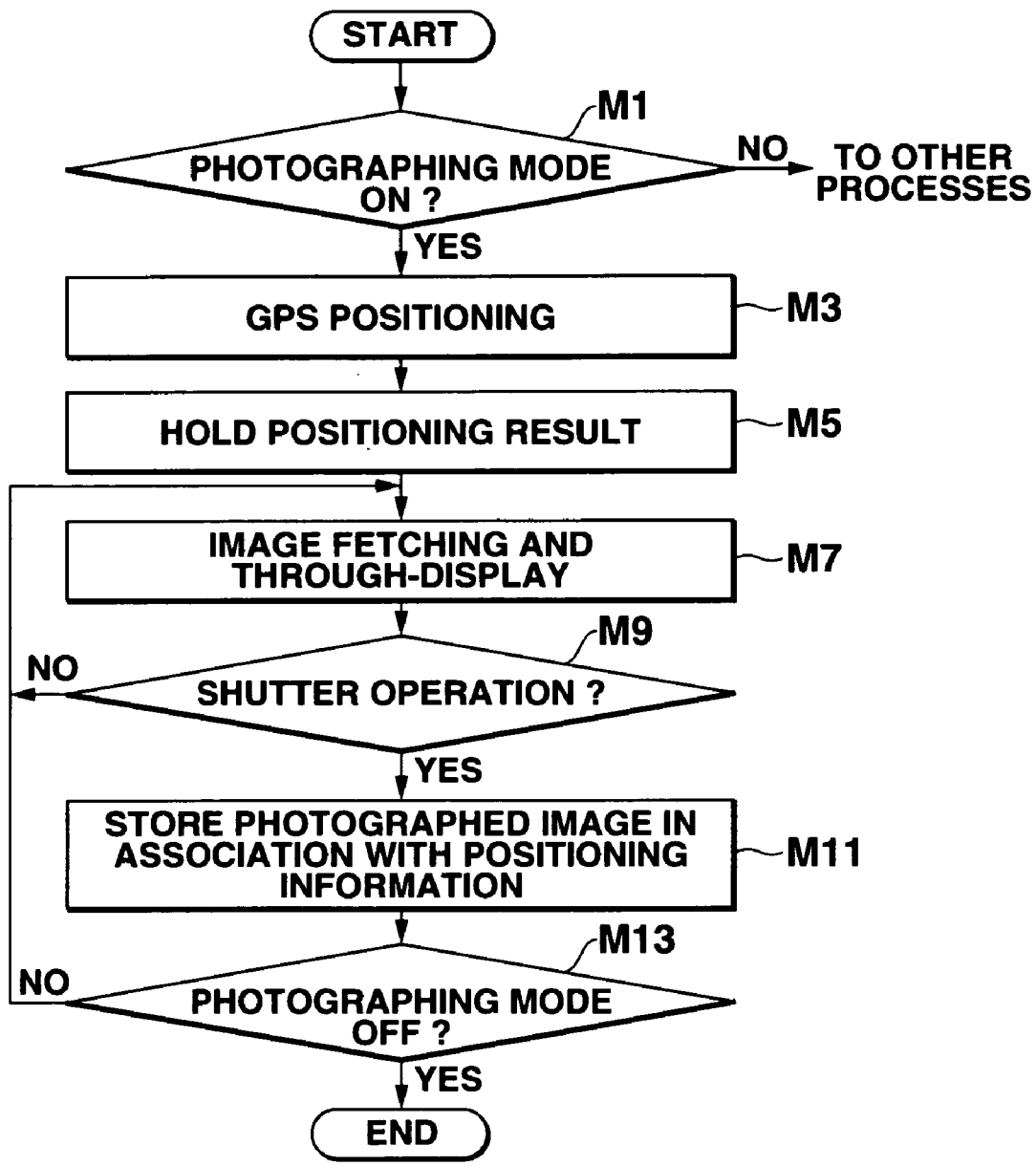
FIG. 16 is a flowchart illustrating a routine in the case where GPS positioning is performed when the photographing mode is enabled.

FIG. 16 is a flowchart illustrating a routine in the case where GPS positioning is performed when the photographing mode is enabled.

In step M1 in FIG. 16, the control section 3 reads process mode select menu data (or icon data) or the like from the program memory 3c and sends the data to the display section 7 and displays it on the screen, prompting the user to make a selection. The control section 3 checks the state signal sent from the operation section 4. When the selected processing mode is the photographing mode (when the photographing mode is enabled), the control section 3 sends a control signal to the GPS processing section 1 and goes to step M3.

When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3 in step M3. After completing one cycle of positioning, the GPS processing section 1 proceeds to the next cycle of positioning, so that when receiving the positioning result from the GPS processing section 1, the control section 3 sends a positioning end instruction signal to the GPS processing section 1 to prevent the GPS processing section 1 from going to the next cycle and stop positioning.

In step M5, the control section 3 stores the positioning result (positioning information) received from GPS processing section 1 into the positioning era result memory area in the RAM 3b (or DRAM 5).

In step M7, the control section 3 sends a control signal to the image pickup section 2 to fetch a subject image. The image pickup section 2 stores the subject image (image data) into the DRAM 5 via the optical system. The fetched image is also subjected to through-display on the display section 7.

Next, the control section 3 checks the state signal sent from the operation section 4 in step M9. When it is determined that the shutter button 46 has been depressed fully, the control section 3 determines that there is a photographing instruction and proceeds to step M11.

In step M11, the control section 3 performs compression on the photographed image stored in the DRAM 5 and stores the compressed image data in the flash memory 6. At this time, the positioning result stored in the RAM 3*b* in step M5 is stored in association with the photographed image (image data).

In the next step M13, the control section 3 checks the state signal from the operation section 4 to determine if there has been an operation to terminate the current photographing mode. When such a termination operation has been performed, the control section 3 terminates the photographing mode (disables the photographing mode).

With the above-described structure, positioning is executed at the beginning of the photographing mode (when the photographing mode is set on) and the positioning result is saved in association with individual photographed images that have been picked up during the photographing mode. Therefore, the GPS positioning process has only to be executed once at the beginning of the photographing mode, so that the user can perform the shutter manipulation without being conscious about positioning (because the user need not wait for positioning to be completed). With the motif being unchanged, generally, the photographing position is not changed during the photographing mode but when the user wants to change the location, the user moves to a new location with the photographing mode disabled and starts taking pictures with a new motif after enabling the photographing mode again. Even with single positioning performed at the beginning of the photographing mode, positional information associated with a photographed image matches with the actual photographing location in most cases.

Figure 17:
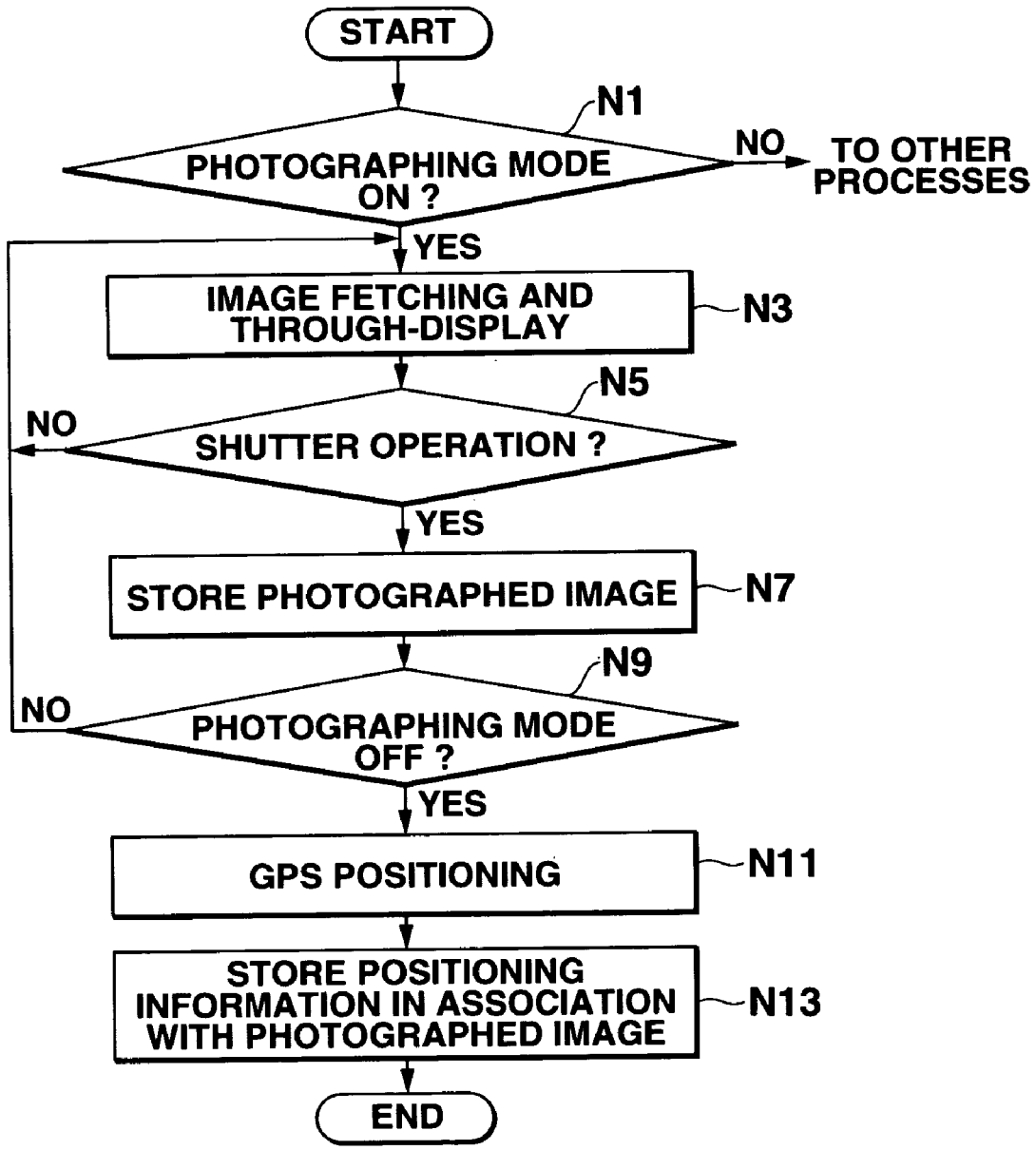
FIG. 17 is a flowchart illustrating a routine in the case where GPS positioning is performed when the photographing mode is disabled.

FIG. 17 is a flowchart illustrating a routine in the case where GPS positioning is performed when the photographing mode is disabled.

In step N1 in FIG. 17, the control section 3 reads process mode select menu data (or icon data) or the like from the program memory 3*c* and sends the data to the display section 7 and displays it on the screen, prompting the user to make a selection. The control section 3 checks the state signal sent from the operation section 4. When the selected processing mode is the photographing mode (when the photographing mode is enabled), the control section 3 goes to step N3.

In step N3, the control section 3 sends a control signal to the image pickup section 2 to fetch a subject image. The image pickup section 2 stores the subject image (image data) into the DRAM 5 via the optical system. The fetched image is also subjected to through-display on the display section 7.

Next, the control section 3 checks the state signal sent from the operation section 4 in step N5. When it is determined that the shutter button 46 has been depressed fully, the control section 3 considers that there is a photographing instruction and proceeds to step N7.

In step N7, the control section 3 performs compression on the photographed image stored in the DRAM 5 and stores the compressed image data in the flash memory 6.

In the next step N9, the control section 3 checks the state signal from the operation section 4 to determine if there has been an operation to terminate the current photographing mode. When such a termination operation has been performed, the control section 3 proceeds to step N1 (the photographing mode disabled). When the termination operation is not performed even after a predetermined time passes, the control section 3 returns to step N3.

In the next step N11, the control section 3 sends the positioning start instruction signal to the GPS processing section 1. When receiving the positioning start instruction signal from the control section 3, the GPS processing section 1 activates the GPS positioning apparatus to execute a reception process on radio waves received via the GPS antenna 1*a*, computes the local position (coordinates) of the digital camera 100 and sends the positioning result (computed value) to the control section 3. After completing one cycle of positioning, the GPS processing section 1 proceeds to the next cycle of positioning, so that when receiving the positioning result from the GPS processing section 1, the control section 3 sends a positioning end instruction signal to the GPS processing section 1 to prevent the GPS processing section 1 from going to the next cycle and stop positioning.

In the next step N13, the control section 3 stores the positioning result received from GPS processing section 1 in the step N11 in association with the individual photographed images (image data) stored in the flash memory 6 in the photographing operation of the steps N3 to N7, and then terminates this routine.

With the above-described structure, positioning is executed when a series of photographing actions and storage of photographed images are completed and the photographing mode is disabled, and the positioning result is saved in association with individual photographed images that have been picked up during the photographing mode. This can allow the user to take pictures without being conscious about positioning. With the motif being unchanged, generally, the photographing position is not changed during the photographing mode but when the user wants to change the location, the user moves to a new location with the photographing mode disabled and initiates photographing with a new motif after enabling the photographing mode again. Even with single positioning performed when the photographing mode is ended, positional information associated with a photographed image matches with the actual photographing location in most cases.

Figure 18:
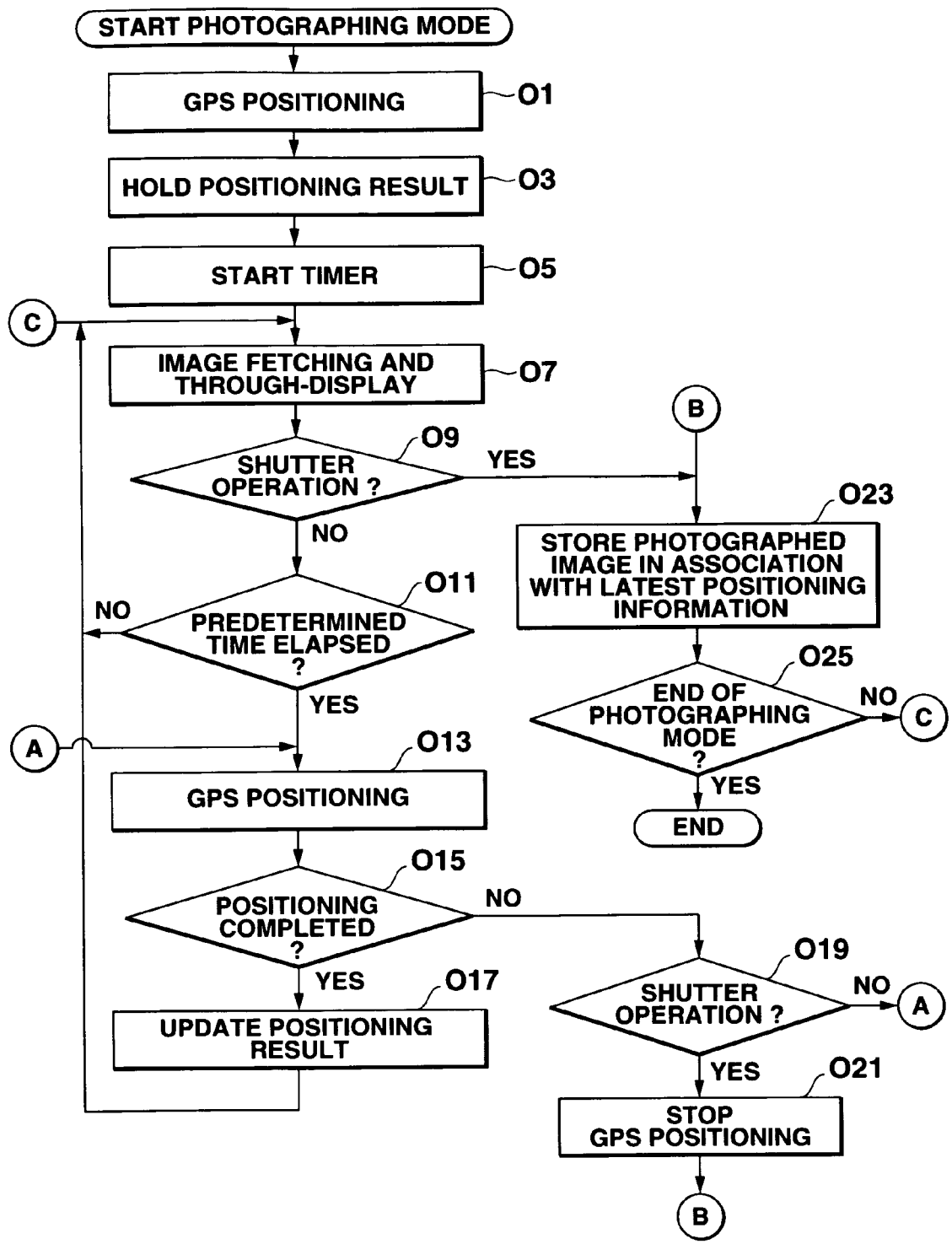
FIG. 18 is a flowchart showing a routine in the case where positioning information is updated by a photographing interval and is adapted to a photographed image which is acquired thereafter.

FIG. 18 is a flowchart showing a routine in the case where positioning information is updated by a photographing interval and is adapted to a photographed image which is acquired thereafter.

In step O1 in FIG. 18, when the photographing mode is selected, the control section 3 sends the positioning start instruction signal to the GPS processing section 1. When receiving the positioning start instruction signal from the control section 3, the GPS processing section 1 activates the GPS positioning apparatus to execute a reception process on hug radio waves received via the GPS antenna 1*a*, computes the local position (coordinates) of the digital camera 100 and sends the positioning result (computed value) to the control section 3. After completing one cycle of positioning, the GPS processing section 1 proceeds to the next cycle of positioning, so that when receiving the positioning result from the GPS processing section 1, the control section 3 sends a positioning end instruction signal to the GPS processing section 1 to prevent the GPS processing section 1 from going to the next cycle and stop positioning.

In the next step O3, the control section 3 stores the positioning result (positioning information) received from GPS processing section 1 into the positioning result memory area in the RAM 3*b* (or DRAM 5).

Next, the control section 3 causes the timer to start measuring the time in step O5.

In step O7, the control section 3 sends a control signal to the image pickup section 2 to fetch a subject image. The image pickup section 2 stores the subject image (image data) into the DRAM 5 via the optical system. The fetched image is also subjected to through-display on the display section 7.

Next, the control section 3 checks the state signal sent from the operation section 4 in step O9. The control section 3 proceeds to step O23 when it is determined that the shutter button 46 has been depressed fully, but proceeds to step O11 otherwise.

In step O11, the control section 3 checks the time measured by the timer that has been started in step O5. The control section 3 proceeds to step O13 when the measured time elapses a predetermined time (e.g., 10 seconds), but returns to step O7 otherwise. This allows the control section 3 to check the time elapsed after the shutter operation is performed or the photographing mode is set. When the shutter operation is not performed over a predetermined time, it is considered that the user is moving with the photographing mode enabled in order to change the photographing location and positioning information can be updated as shown in steps O13, O15 and O17.

In step O13, the control section 3 sends the positioning start instruction signal to the GPS processing section 1. When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3.

In step O15, the control section 3 checks if the GPS positioning process has been completed. When the GPS positioning process has been completed, the control section 3 controls the GPS processing section 1 in such a way that the GPS processing section 1 does not go to the next cycle. In step O17, the control section 3 overwrites the content of the positioning result in the RAM 3b (or DRAM 5) with the positioning result (positioning information) received from the GPS processing section 1, thus updating the positioning result, and then returns to step O7. When the GPS positioning process has not been completed yet, the control section 3 proceeds to step O19.

In step O19, the control section 3 checks if the shutter operation has been done during positioning. The control section 3 sends a control signal (positioning stop instruction signal) to the GPS processing section 1 in step O21 and proceeds to step O23, when the shutter operation has been performed, but proceeds to step O13 otherwise. When receiving the control signal from the control section 3, the GPS processing section 1 stops the positioning operation.

In step O23, the control section 3 performs compression on the photographed image stored in the DRAM 5 and stores the compressed image data (as a photographed image) in the flash memory 6. At this time, the positioning result (positioning information) stored in the RAM 3b in step O3 or step O13 is stored in association with the photographed image (image data). In other words, when the shutter operation is sequentially carried out within a predetermined time from the start, the positioning result that is to be associated with a photographed image is the first positioning result that is held in step O3. When the shutter operation is carried out after the predetermined time passes, the positioning information updated in step O13 is associated with the photographed image that is acquired by that shutter operation (and photographed images obtained by the subsequent shutter operation which is executed at a predetermined time interval after the former shutter operation).

In step O25, the control section 3 checks the state signal from the operation section 4 to determine if there has been an operation to terminate the current photographing mode.

With the above-described structure, positioning is executed once at the beginning of the photographing mode (when the photographing mode is set on) and the positioning result is saved and when the photographing interval is too long, positioning is performed again to update the positioning result. Therefore, updated positioning information is associated with the photographed image after elapsing of a predetermined time. This can allow updated positioning information to be associated with the photographed image when the photographing location is changed during the photographing mode.

Positioning is carried out at a predetermined time interval when no picture is taken, but is stopped when a shutter operation is performed during positioning and the held positioning result is stored in association with each photographed image. Thus, the user can perform the shutter manipulation without being conscious about whether or not positioning is being carried out, except for the first positioning.

Figure 19:
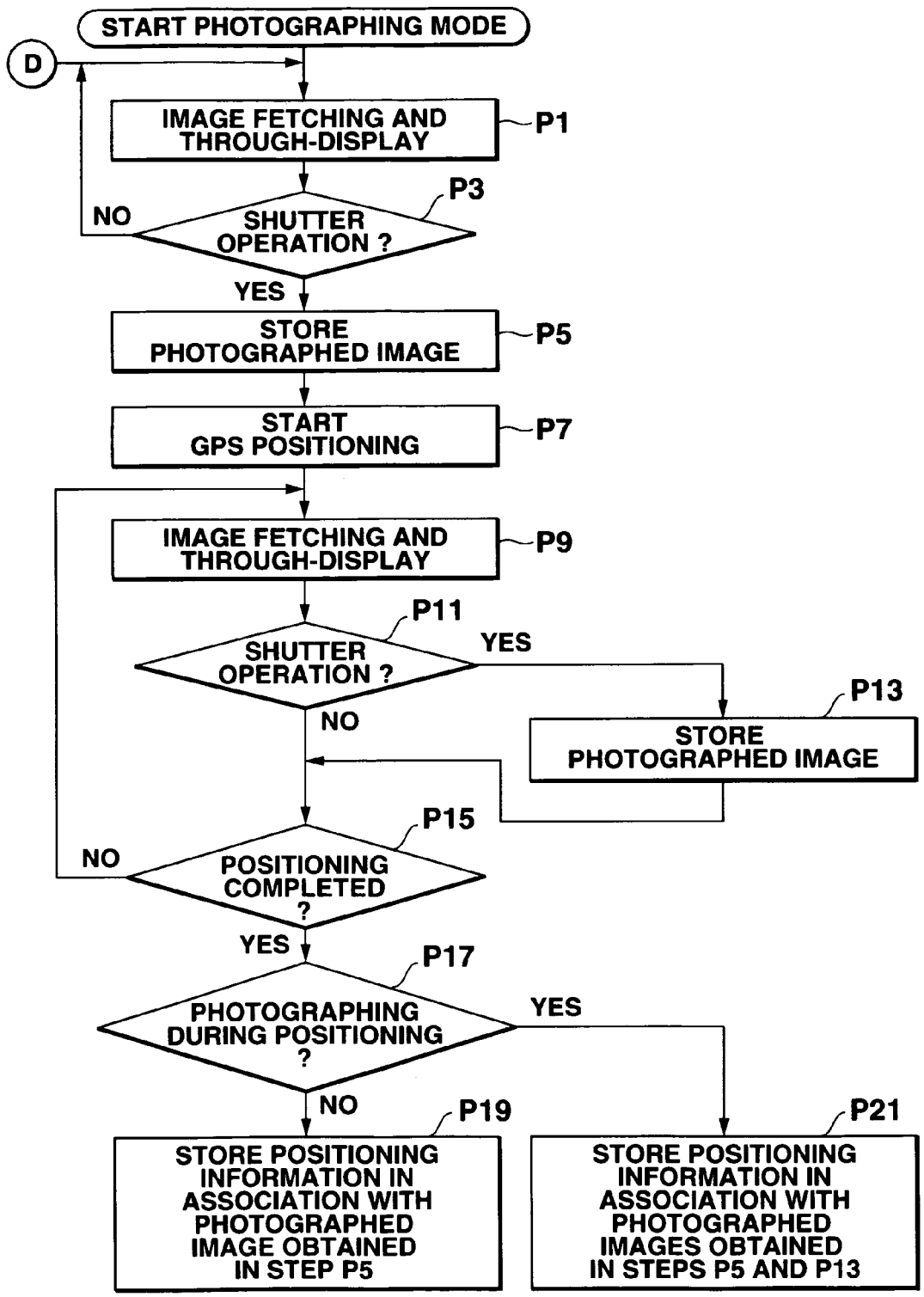
FIG. 19 is a flowchart showing a routine in the case where when a picture is taken during positioning after photographing, the positioning result is also adapted to that photographed image.

FIG. 19 is a flowchart showing a routine in the case where when a picture is taken during positioning after photographing, the positioning result is also adapted to that photographed image.

In step P1 in FIG. 19, when the photographing mode starts, the control section 3 sends a control signal to the image pickup section 2 to fetch a subject image. The image pickup section 2 stores the subject image (image data) into the DRAM 5 via the optical system. The fetched image is also subjected to through-display on the display section 7.

Next, the control section 3 checks the state signal sent from the operation section 4 in step P3. When it is determined that the shutter button 46 has been depressed fully, the control section 3 considers that there is a photographing instruction and proceeds to step P5.

In step P5, the control section 3 performs compression on the photographed image stored in the DRAM 5 and stores the compressed image data in the flash memory 6.

In the next step P7, the control section 3 sends the positioning start instruction signal to the GPS processing section 1. When receiving the positioning start instruction signal from the control section 3, the GPS processing section 1 activates the GPS positioning apparatus to start execute a reception process on radio waves received via the GPS antenna 1a and a positioning process, such as computation of the local position (coordinates) of the digital camera 100.

In the next step P9, the control section 3 also sends the control signal to the image pickup section 2 during the positioning by the GPS processing section 1 to fetch a subject image. The image pickup section 2 stores the subject image (image data) into the DRAM 5 via the optical system. The fetched image is also subjected to through-display on the display section 7.

Next, the control section 3 checks the state signal sent from the operation section 4 in step P11. When it is determined that the shutter button 46 has been depressed fully, the control section 3 considers that there is a photographing instruction and proceeds to step P13. When otherwise, the control section 3 goes to step P15.

In step P13, the control section 3 performs compression on the photographed image stored in the DRAM 5 and stores the compressed image data in the flash memory 6. (In this case, an image counter (initial value=0) for counting the number of photographed images picked up and stored during positioning may be provided in the RAM 3b (or DRAM 5) and "1" may be added to the value of the image counter so as to facilitate decision in step P17.)

In the next step P15, when positioning is completed, the GPS processing section 1 sends the positioning result (computed value) to the control section 3. As the GPS processing section 1 goes to the next positioning process after one cycle of positioning is completed, the control section 3 checks if the positioning result is received from the GPS processing section 1, and when such a positioning result is received, the control section 3 determines that one cycle of positioning is completed and sends the positioning end instruction signal to the GPS processing section 1 to prevent the GPS processing section 1 from going to the next cycle and stop the positioning process. The control section 3 then proceeds to step P17.

In step P17, the control section 3 checks if there is an image (photographed image) which has been picked up during positioning in the step P11 and has been stored in the step P13. The control section 3 goes to step P21 when there is a photographed image stored in step P13, but goes to step P19 otherwise. (In the case where the image counter is provided, when the value of the image counter is equal to or greater than "1", the control section 3 sets the value of the counter to "0" before going to step P21, and when the value of the image counter is "0", the control section 3 goes to step P19.)

In step P19, the control section 3 stores the positioning result received from the GPS processing section 1 in association with the photographed image stored in the flash memory 6 in the step P5, and then returns to step P1.

In step P21, the control section 3 stores the positioning result received from the GPS processing section 1 in association with the photographed images stored in the flash memory 6 in the steps P5 and P13, and then returns to step P1 to perform the subsequent process of acquiring a next image.

With the above-described structure, positioning is executed after photographing and storage of a photographed image are completed, photographing is made possible even during positioning, and when a picture is taken during positioning, the photographed image is stored, and after positioning is completed, the current positioning result is saved in association with the currently stored photographed image (also with an image which has been picked up and stored during positioning). This can allow the user to keep taking pictures without being conscious about positioning.

When a photographing operation is performed during positioning after photographing, a picture is allowed to taken during positioning in the above-described embodiment of FIG. 19. Alternatively, when a photographing operation is performed during positioning after photographing, positioning may be stopped and the previous positioning information may be adapted to the photographed image (including the image that has been picked up during positioning in this case).

Figure 20:
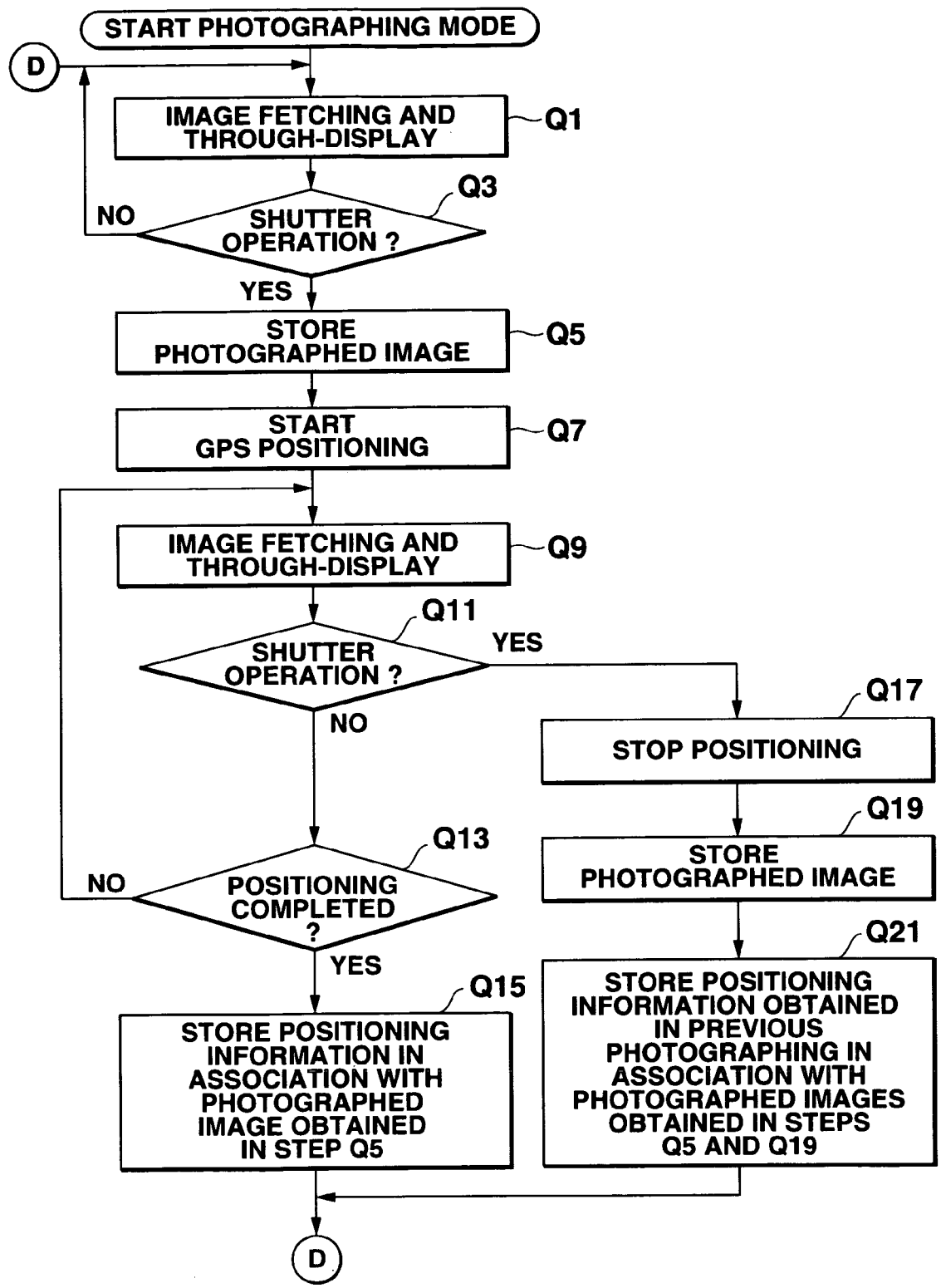
FIG. 20 is a flowchart illustrating a routine in the case where when a picture is taken during positioning after photographing, positioning is stopped and previous positioning information is adapted to the photographed image.

FIG. 20 is a flowchart illustrating a routine in the case where when a picture is taken during positioning after photographing, positioning is stopped and previous positioning information is adapted to the photographed image.

As processes in steps Q1, Q3, Q5, and Q7 in FIG. 20 are similar to those in steps P1, P3, P5, and P7, their description will be omitted.

When through-display of an image is performed in step Q9 in FIG. 20, the control section 3 checks the state signal sent from the operation section 4 to determine if the shutter button 46 has been fully depressed in step Q11. When determining that full depression of the shutter button 46 has occurred, the control section 3 considers that there is a photographing instruction and proceeds to step Q17. Otherwise, the control section 3 goes to step Q13.

In step Q17, the control section 3 sends a control signal (positioning stop instruction signal) to the GPS processing section 1 and then proceeds to step Q19. When receiving the control signal from the control section 3, the GPS processing section 1 stops the positioning operation.

In step Q19, the control section 3 performs compression on the image data stored in the DRAM 5 and stores it as a photographed image in the flash memory 6.

In step Q21, the control section 3 stores the positioning result received from the GPS processing section 1 previously (in step Q13) in association with the image data that has been stored in the flash memory 6 in the steps Q5 and Q19, and then returns to step Q1.

When positioning is completed in step Q13, the GPS processing section 1 sends the positioning result (computed value) to the control section 3. As the GPS processing section 1 goes to the next positioning process after one cycle of positioning is completed, the control section 3 checks if the positioning result is received from the GPS processing section 1, and when such a positioning result is received, the control section 3 determines that one cycle of positioning is completed and sends the positioning end instruction signal to the GPS processing section 1 to prevent the GPS processing section 1 from going to the next cycle and stop the positioning process. The control section 3 then proceeds to step Q15. The control section 3 overwrites the content of the positioning result memory area in the RAM 3b (DRAM 5) with the positioning result received from the GPS processing section 1.

With the above-described structure, positioning is executed after photographing and storage of a photographed image are completed, photographing is made possible even during positioning, and when a picture is taken during positioning, the photographed image is stored, and after positioning is completed, the current positioning result is saved in association with the currently stored photographed image. This can allow the user to keep taking pictures without being conscious about positioning. Alternatively, when a photographing operation is performed during positioning, positioning may be stopped (priority to photographing) and a picture may be taken and the previous positioning result may be stored in association with the image that has been picked up this time in steps Q5 and Q19. Accordingly, the user can perform the shutter operation without being conscious about positioning at the time of taking a picture.

Figure 21:
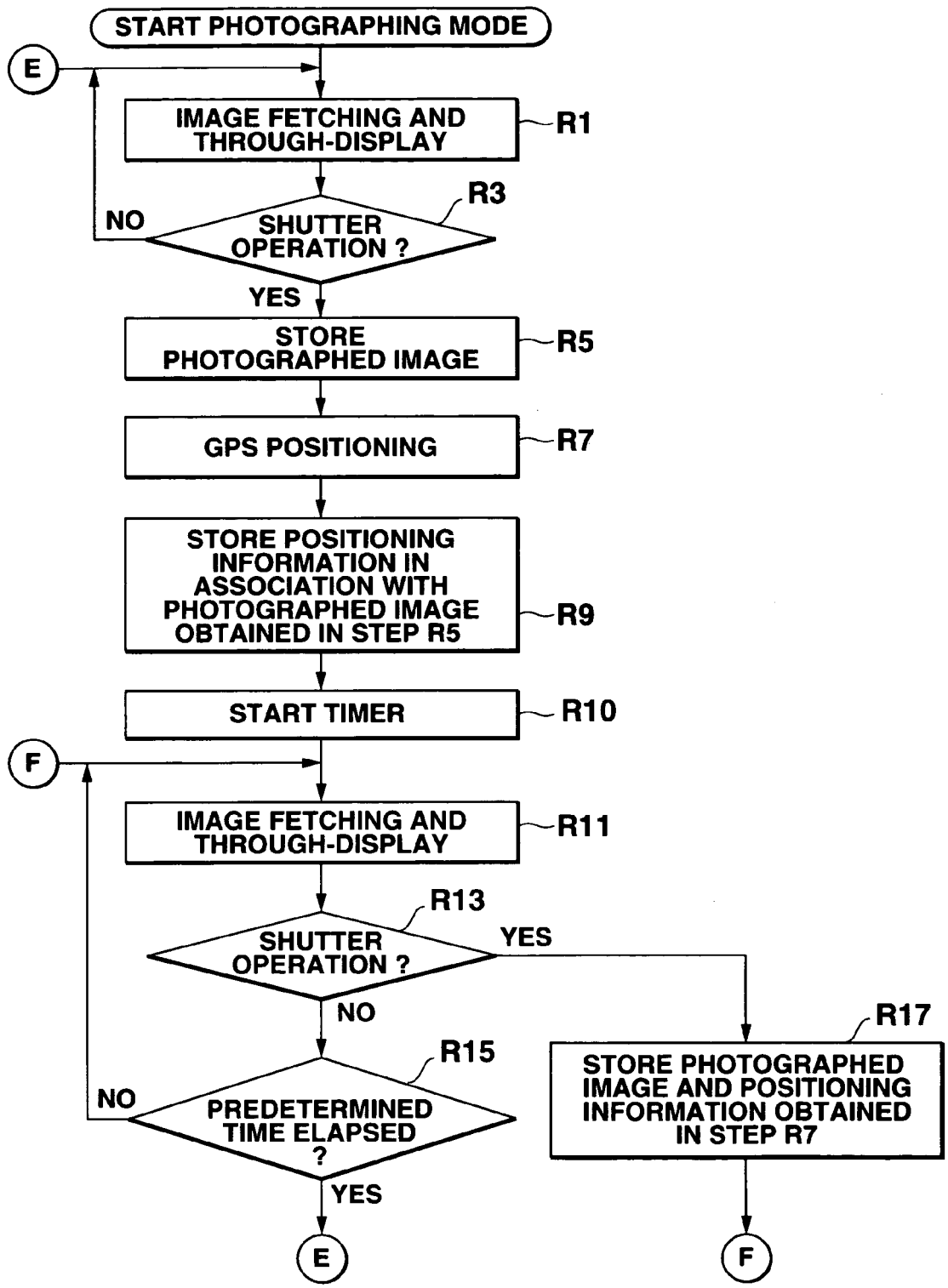
FIG. 21 is a flowchart illustrating a routine in the case where the result of positioning executed after photographing is adapted to the photographed image.

FIG. 21 is a flowchart illustrating a routine in the case where the result of positioning executed after photographing is adapted to the photographed image.

In step R1 in FIG. 21, when the photographing mode starts, the control section 3 sends a control signal to the image pickup section 2 to fetch a subject image. The image pickup section 2 stores the subject image (image data) into the DRAM 5 via the optical system. The fetched image is also subjected to through-display on the display section 7.

In step R3, the control section 3 checks the state signal sent from the operation section 4. When it is determined that the shutter button 46 has been depressed fully, the control section 3 considers that there is a photographing instruction and proceeds to step R5.

In step R5, the control section 3 performs compression on the photographed image stored in the DRAM 5 and stores the compressed image data as a photographed image in the flash memory 6.

In the next step R7, the control section 3 sends the positioning start instruction signal to the GPS processing section 1. When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3. After completing one cycle of positioning, the GPS processing section 1 proceeds to the next cycle of positioning, so that when receiving the positioning result from the GPS processing section 1, the control section 3 sends a positioning end instruction signal to the GPS processing section 1 to prevent the GPS processing section 1 from going to the next cycle and stop positioning.

In the next step R9, the control section 3 stores the positioning result acquired in the step R7 (positioning information (position data (coordinate values) of the digital camera 100)) in association with the photographed image in the step R5. Then, the control section 3 causes the timer to start measuring the time (initial value=0) in step R10.

In step R11, the control section 3 sends a control signal to the image pickup section 2 to fetch a subject image. The image pickup section 2 stores the subject image (image data) into the DRAM 5 via the optical system. The fetched image is also subjected to through-display on the display section 7.

In the next step R13, the control section 3 checks the state signal sent from the operation section 4. The control section 3 proceeds to step R17 when it is determined that the shutter button 46 has been depressed fully, but proceeds to step R15 otherwise.

In step R15, the control section 3 checks the time measured by the timer that has been started in step R10. The control section 3 returns to step R1 when the measured time elapses a predetermined time (e.g., 10 seconds), but returns to step R11 otherwise.

In step R17, the control section 3 performs compression on the photographed image stored in the DRAM 5 and stores the compressed image data as a photographed image in the flash memory 6. At this time, the control section 3 stores the positioning result received from the GPS processing section 1 in the step R7 in association with the photographed image, sets the timer to "0" and returns to step R1 to execute the subsequent process of acquiring a next image.

The execution of the process in the step R17 is not limited to the case when there is no shutter operation done in step R13 (i.e., this step of determining the elapsing time can be carried out at any of the timings of the steps R3 to R9).

With the above-described structure, positioning is executed after photographing and storage of a photographed image are completed, photographing is made possible within a predetermined period after positioning, and when a picture is taken within the predetermined time, the photographed image is stored, and the positioning result is saved in association with the stored photographed image. This can allow the user to keep taking pictures without being conscious about positioning (i.e., when the time elapsed after the shutter operation and no shutter operation is performed over a predetermined time, photographing is possible (steps S9 to S17)).

Note that the positioning timing for positioning information which is to be stored in association with the photographed image is not limited to the described one of the above-described embodiment.

For example, the structure may be modified in such a way that positioning is executed when the date or the date and hour are changed. Specifically, although positioning is performed when the camera is powered off or on in the examples of FIGS. 14 and 15 and positioning is performed when the photographing mode is enabled or disabled in the examples of FIGS. 16 and 17, a change in the date or the date and hour may be determined in step K1 in FIG. 14 (or in step M1 in FIG. 16) and when there is such a change, positioning and storage of positioning information may be carried out in steps K3 and K5 (or steps M3 and M5). In this case, when no change occurs in the date or the date and hour in step K1 (M1), the flow should go to step K7 (M7), and when photographing is not completed in steps K11 and K15 (M9 and M13), the flow should go to step K1 (M1).

Further, a change in the date or the date and hour may be determined in step L13 in FIG. 15 (or in step N9 in FIG. 17) and when there is such a change, positioning may be carried out in step L15 (N11). In this case, when no change occurs in the date or the date and hour in step L13 (N9), the flow should go to step L17 (N13).

The structure may alternatively be modified in such a way that positioning is executed when a folder for storing photographed images is changed.

Specifically, the structure may be so modified as to be able to set (or selectively set) a holder for storing photographed images in step K1 in FIG. 14 (or in step M1 in FIG. 16), whereby when a folder is set (or selectively set), positioning and saving of positioning information are performed in steps K3 and K5 (M3 and M5). In this case, when a holder is not set (or selectively set), the flow should go to step K7 (M7). Note that a folder is set on a saving memory such as the flash memory 6 by the setting (or selectively setting) operation. (A folder is set, for example, for each specific motif or for each photographing date.)

Alternatively, the structure may be so modified as to be able to set (or selectively set) a new holder or select an existing folder in step L13 in FIG. 15 (or in step N9 in FIG. 17), whereby when a folder is set (or selectively set), positioning is performed in step L15 (N11). In this case, when no holder is set (or selectively set) in step L13 (N9), the flow should go to step L17 (N13).

The above-described modified structures can also allow the user to take pictures without being conscious about positioning.

Further, positioning may be performed by a combination of the above-described methods illustrated in FIGS. 14 to 21. For instance, the structure may be so modified that positioning is not performed every time the camera is powered on or off but is performed only when the date is changed (a combination of the methods of FIGS. 14 and 15 and the methods of FIGS. 19 to 21).

Although the GPS processing section 1 goes to the next cycle of positioning after sending the positioning result (computed value) to the control section 3 in the foregoing description of FIGS. 14 to 21, the structure may be modified so that when one cycle of positioning is performed and the positioning result is sent to the control section 3, the positioning process is interrupted or it is stopped until an instruction is given from the control section 3.

Although the foregoing description of the individual examples has been given of the case where photographed images are stored in association with positioning information in one to one correspondence at the time of adapting the positioning information, the stored photographed images may be associated with the positioning information. (For example, an image information list may be provided so that at the time of storing photographed images, positioning information and link information for the corresponding image are recorded).

Although the photographing mode can be disabled only for a predetermined time after photographing or the camera can be powered off only for a predetermined time after the photographing mode is disabled in the above-described embodiment, the photographing mode may be disabled at an arbitrary timing in the photographing mode or the camera may be powered off at an arbitrary timing while the power is on.

Alternatively, plural types of photographing modes may be provided so that the positioning timing control operation of this invention is performed only when a predetermined one of the photographing modes is selectively set, and positioning is performed for each photographing when the other photographing modes are selectively set.

The third embodiment of this invention will now be described.

[Method of Adapting Positioning Timing and Positioning Information to Photographed Image]

As mentioned earlier, if positioning is performed every time a picture is taken in the series photographing mode, the series photographing interval varies. According to this invention, therefore, series photographing is made possible at a given photographing interval by adapting positioning information obtained by positioning at a predetermined timing to each of serially photographed images (which are a plurality of photographed images that have been serially picked up at a given photographing interval by the series photographing capability). The adaptation of positioning information may be accomplished by one of the following three schemes. The first one is to store the same positioning information in association with each of serially photographed images in one to one correspondence. The second scheme is to associate one positioning information with each of serially photographed images and display the positioning information in association with each image at the time of reproduction. Thirdly, positioning information which is obtained by interpolating positioning information that has been acquired at the beginning and end of series photographing is adapted to each of the serially photographed images. The following will discuss several examples of the positioning timing control and the operation of adapting positioning information to photographed images.

Figure 22:
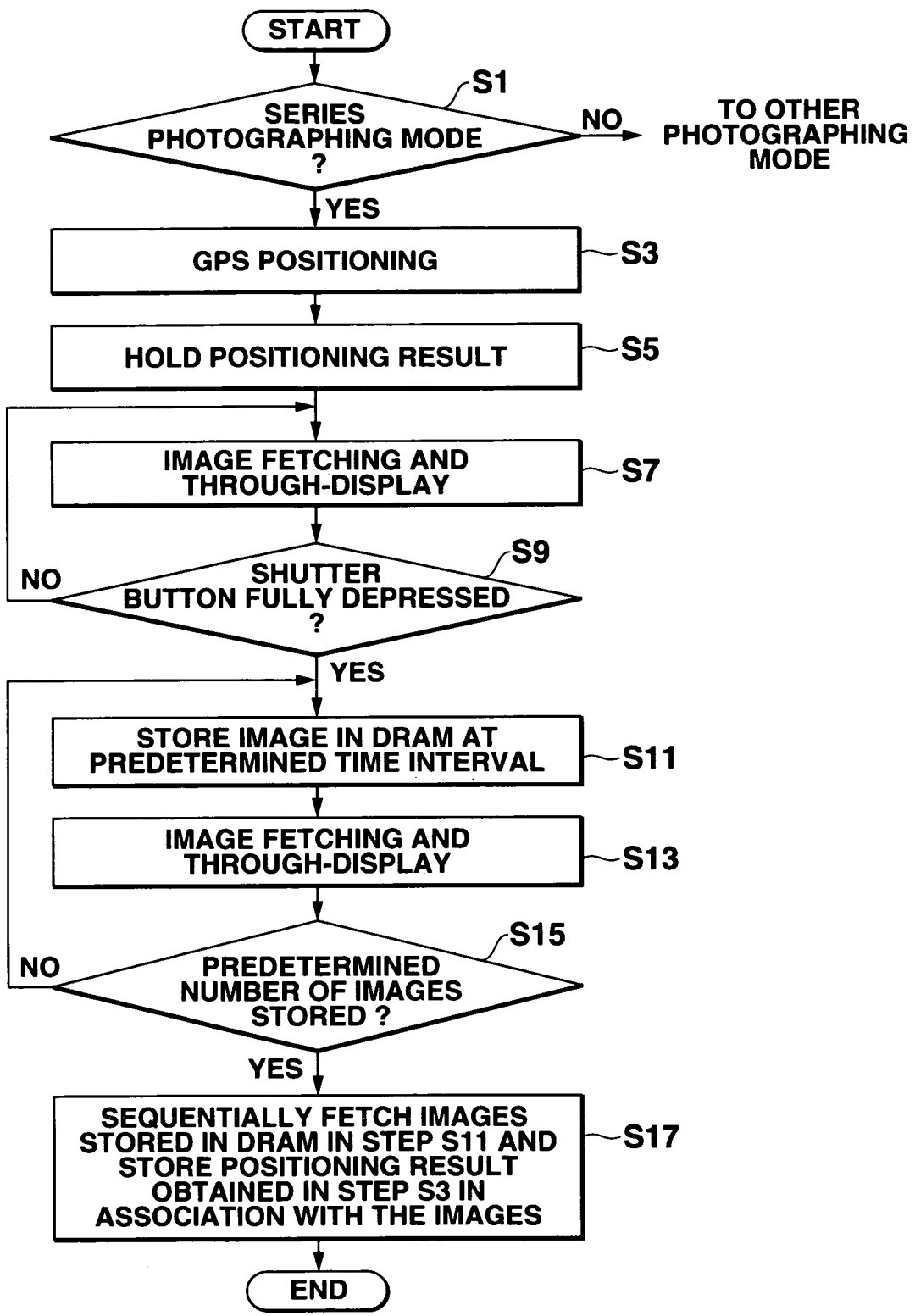
FIG. 22 is a flowchart illustrating a routine in the case where positioning is performed before a series photographing start instruction is issued according to a third embodiment of this invention.

FIG. 22 is a flowchart illustrating a routine in the case where positioning is performed before a series photographing start instruction is issued according to a third embodiment of this invention.

In step S1 in FIG. 22, when the photographing mode starts, the control section 3 reads process mode select menu data (or icon data) or the like from the program memory 3c and sends the data to the display section 7 and displays it on the screen, prompting the user to make a selection. The control section 3 checks the state signal sent from the operation section 4. When the detailed function (mode) of the selected processing mode is the series photographing mode, the control section 3 goes to step S3.

In step S3, the control section 3 sends a control signal (positioning start instruction signal) to the GPS processing section 1. When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3. As the GPS processing section 1 proceeds to the next cycle of positioning after completing one cycle of positioning (which means the process of the next reception cycle of positioning information sent from a GPS satellite at a predetermined period), the control section 3 sends a control signal (positioning end instruction signal) to the GPS processing section 1, when receiving the positioning result from the GPS processing section 1, to prevent the GPS processing section 1 from going to the next cycle and stop positioning.

Note that even if the user selects the series photographing mode and immediately gives the series photographing instruction (shutter operation), series photographing does not start until positioning is completed. In this case, therefore, the display lamp 8 may be flickered to inform the user of positioning being in progress, so that the user will not be confused. Alternatively, a message or mark may be displayed or blinked on the display section 7 or an alarm sound may be generated when the camera is equipped with a sound output device.

In step S5, the control section 3 holds (stores) the positioning result (positioning information) received from GPS processing section 1 into the positioning result memory area in the RAM 3b (or DRAM 5).

At this time, the display lamp 8 may be turned on (or off) to inform the user of the end of positioning or series photographing being possible. Alternatively, a message or mark may be displayed on the display section 7 or an alarm sound may be generated when the camera is equipped with a sound output device.

In step S7, the control section 3 sends a control signal to the image pickup section 2 to fetch a subject image. The image pickup section 2 stores the subject image (image data) into the through image memory area 51 in the DRAM 5 via the optical system. The fetched image is also subjected to through-display on the display section 7.

Next, the control section 3 checks the state signal sent from the operation section 4 in step S9. When it is determined that the shutter button 46 has been depressed fully, the control section 3 determines that there is a series photographing instruction and proceeds to step S11.

In step S11, the control section 3 stores (sequentially and accumulatively stores) images, fetched through the image pickup section 2, into the series photographed image memory area 52 at a predetermined time interval. The fetched images are stored in the through image memory area 51 and are subjected to through-display on the display section 7.

When the digital camera 100 is so designed as to be able to permit a series-photographing release operation during series photographing (e.g., full depression of the shutter button 46 during series photographing), upon detection of the series-photographing release operation, the control section 3 stops accumulative storage of subsequent photographed images and goes to step S17.

In step S15, the control section 3 counts the number of images accumulatively stored in the series photographed image memory area 52, and determines that series photographing is completed when the count reaches a predetermined value, then proceeds to step S17. When the count has not reached the predetermined value, the control section 3 returns to step S11.

In step S17, the control section 3 reads the individual serially photographed images (image data), stored in the series photographed image memory area 52 in the DRAM 5 in the step S11, performs compression on the photographed images one after another and sequentially stores the compressed image data in the flash memory 6. At this time, the positioning result acquired in step S3 (the positioning result held in the RAM 3b in step S5) is stored in association with each of the serially photographed images.

With the above-described structure, positioning is executed before series photographing starts and the positioning result is stored in association with each of serially photographed images, so that the user can perform series photographing without being conscious about positioning. Further, as the positioning operation and the series photographing operation do not overlap each other, it is possible to reduce the load originated from the positioning operation.

Although positioning information at the time of setting the series photographing mode is stored in association with each of serially photographed images in the example of FIG. 22, positioning may be performed at a predetermined time interval during the series photographing mode and the positioning result immediately before the series photographing instruction may be associated with each of serially photographed images.

Figure 23:
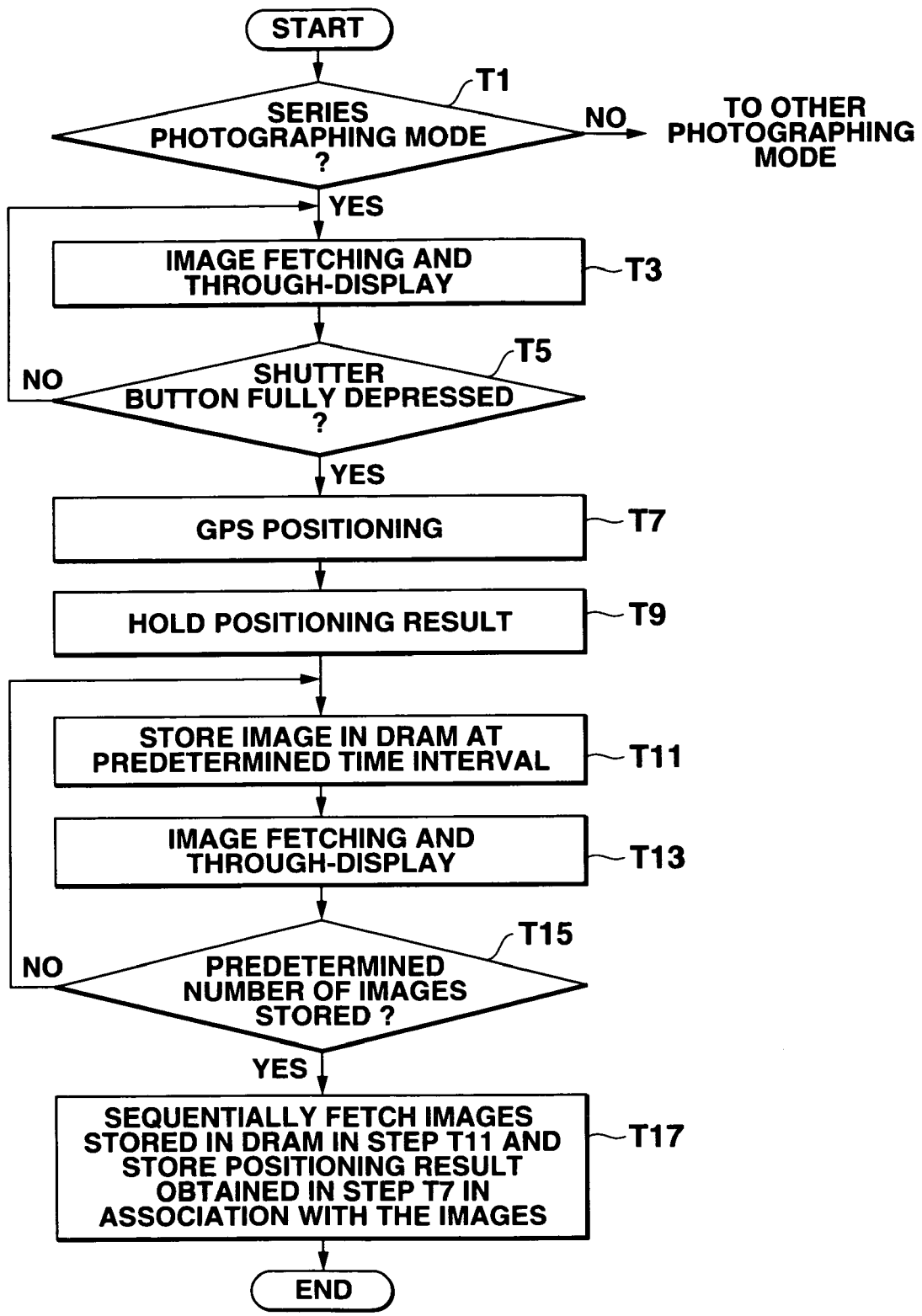
FIG. 23 is a flowchart illustrating a routine in the case where positioning is performed after the series photographing start instruction is issued.

FIG. 23 is a flowchart illustrating a routine in the case where positioning is performed after the series photographing start instruction is issued.

In step T1 in FIG. 23, when the photographing mode starts, the control section 3 reads process mode select menu data or the like from the program memory 3c and sends the data to the display section 7 and displays it on the screen, prompting the user to make a selection. The control section 3 checks the state signal sent from the operation section 4. When the detailed function (mode) of the selected processing mode is the photo-graphing mode, the control section 3 goes to step T3.

In step T3, the control section 3 sends a control signal to the image pickup section 2 to fetch a subject image. The image pickup section 2 stores the subject image (image data) into the through image memory area 51 in the DRAM 5 via the optical system. The fetched image is also subjected to through-display on the display section 7.

In the next step T5, the control section 3 checks the state signal sent from the operation section 4. When it is determined that the shutter button 46 has been depressed fully, the control section 3 considers that there is a series photographing instruction and proceeds to step T7. In step T7, the control section 3 sends a control signal (positioning start instruction signal) to the GPS processing section 1. When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3. As the GPS processing section 1 proceeds to the next cycle of positioning after completing one cycle of positioning, the control section 3 sends a control signal (positioning end instruction signal) to the GPS processing section 1, when receiving the positioning result from the GPS processing section 1, to prevent the GPS processing section 1 from going to the next cycle and stop positioning.

In the next step T9, the control section 3 holds (stores) the positioning result (positioning information) received from GPS processing section 1 in the positioning result memory area in the RAM 3b (or DRAM 5), and then proceeds to step T11. As processes in steps T11 to T17 are similar to those in steps S11 to S17 in FIG. 22, their description will be omitted.

With the above-described structure, positioning is executed after the series photographing instruction is issued and the positioning result is saved in association with each of serially photographed images. Even if the camera is moved before the series photographing instruction is issued, therefore, the photographing start position can be associated with each of serially photographed images.

Figure 24:
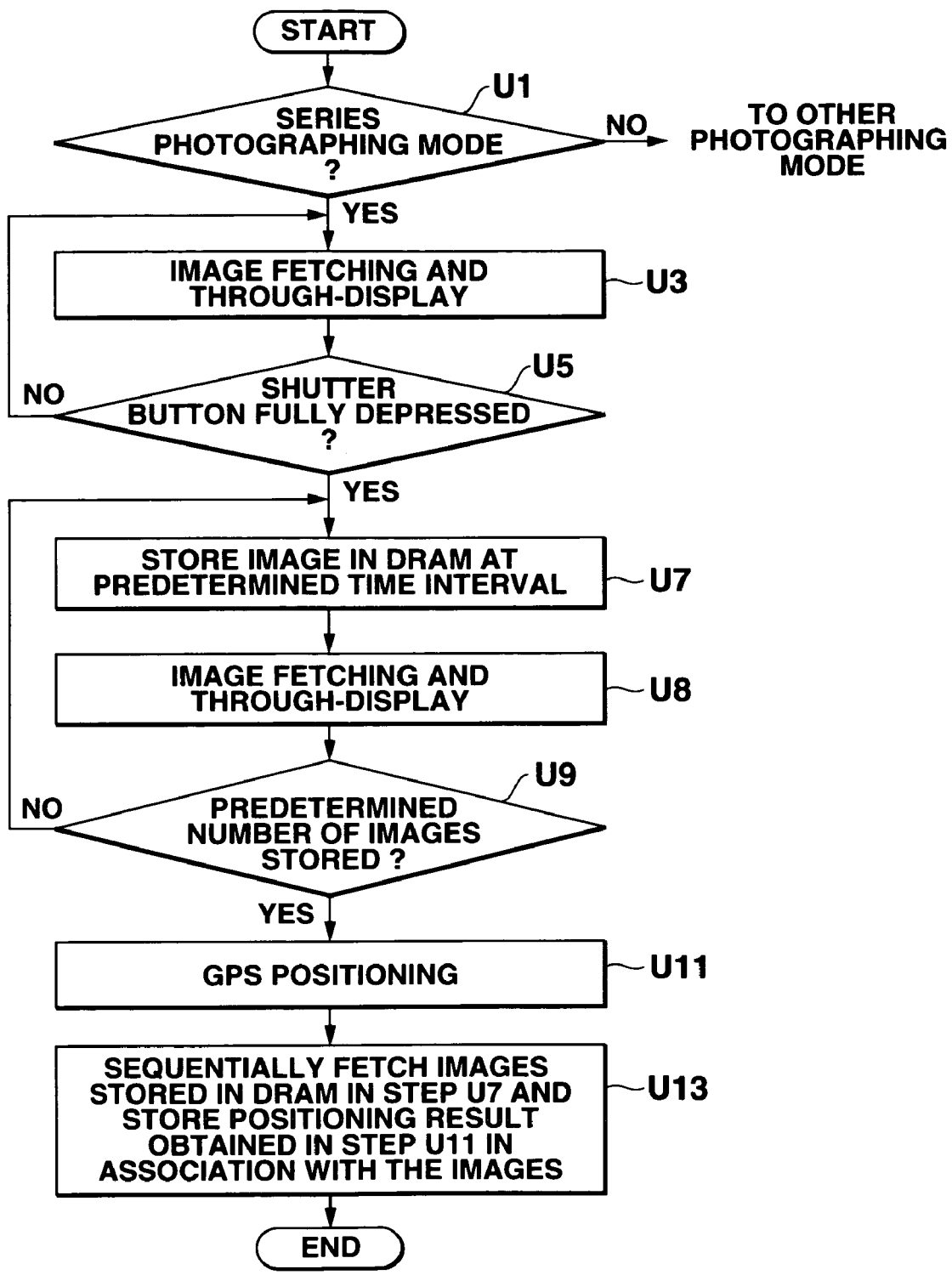
FIG. 24 is a flowchart illustrating a routine in the case where positioning is executed after series photographing is completed.

FIG. 24 is a flowchart illustrating a routine in the case where positioning is executed after series photographing is completed.

In step U1 in FIG. 24, when the photographing mode starts, the control section 3 reads process mode select menu data or the like from the program memory 3c and sends the data to the display section 7 and displays it on the screen, prompting the user to make a selection. The control section 3 checks the state signal sent from the operation section 4. When the detailed function (mode) of the selected processing mode is the photo-graphing mode, the control section 3 goes to step U3.

In step U3, the control section 3 sends a control signal to the image pickup section 2 to fetch a subject image. The image pickup section 2 stores the subject image (image data) into the through image memory area 51 in the DRAM 5 via the optical system. The fetched image is also subjected to through-display on the display section 7.

In the next step U5, the control section 3 checks the state signal sent from the operation section 4. When it is determined that the shutter button 46 has been depressed fully, the control section 3 considers that there is a series photographing instruction and proceeds to step U7.

In step U7, the control section 3 accumulatively stores the images that are fetched through the image pickup section 2 into the series photographed image memory area 52 at a predetermined time interval. In step U8, the control section 3 stores the fetched images into the through image memory area 51 and then performs through-display of the images on the display section 7.

In step U9, when the digital camera 100 is so designed as to be able to permit a series-photographing release operation during series photographing, upon detection of the series-photographing release operation, the control section 3 stops accumulative storage of subsequent photographed images and goes to step U11.

In step U11, the control section 3 counts the number of images accumulatively stored in the series photographed image memory area 52, and determines that series photographing is completed when the count reaches a predetermined value, then proceeds to step U13. When the count has not reached the predetermined value, the control section 3 returns to step U7.

In step U13, the control section 3 sends a control signal (positioning start instruction signal) to the GPS processing section 1. When receiving the positioning start instruction signal from the control section 3, the GPS processing section 1 activates the GPS positioning apparatus to execute a reception process on radio waves received via the GPS antenna 1a, computes the local position of the digital camera 100 and sends the positioning result to the control section 3. As the GPS processing section 1 proceeds to the next cycle of positioning after completing one cycle of positioning, the control section 3 sends a control signal (positioning end instruction signal) to the GPS processing section 1, when receiving the positioning result from the GPS processing section 1, to prevent the GPS processing section 1 from going to the next cycle and stop positioning.

In the next step U15, the control section 3 performs compression on the individual serially photographed images (image data), stored in the series photographed image memory area 52 in the DRAM 5 in the step U7, one after another, and sequentially stores the compressed image data in the flash memory 6. At this time, the positioning result acquired in step U13 is stored in association with each of the serially photographed images.

With the above-described structure, positioning is executed immediately before serially photographed images or the like are stored and the positioning result is saved in association with each of serially photographed images, so that the user can perform series photographing without being conscious about positioning. Further, as the positioning operation and the series photographing operation do not overlap each other, it is possible to reduce the load originated from the positioning operation.

Figure 25:
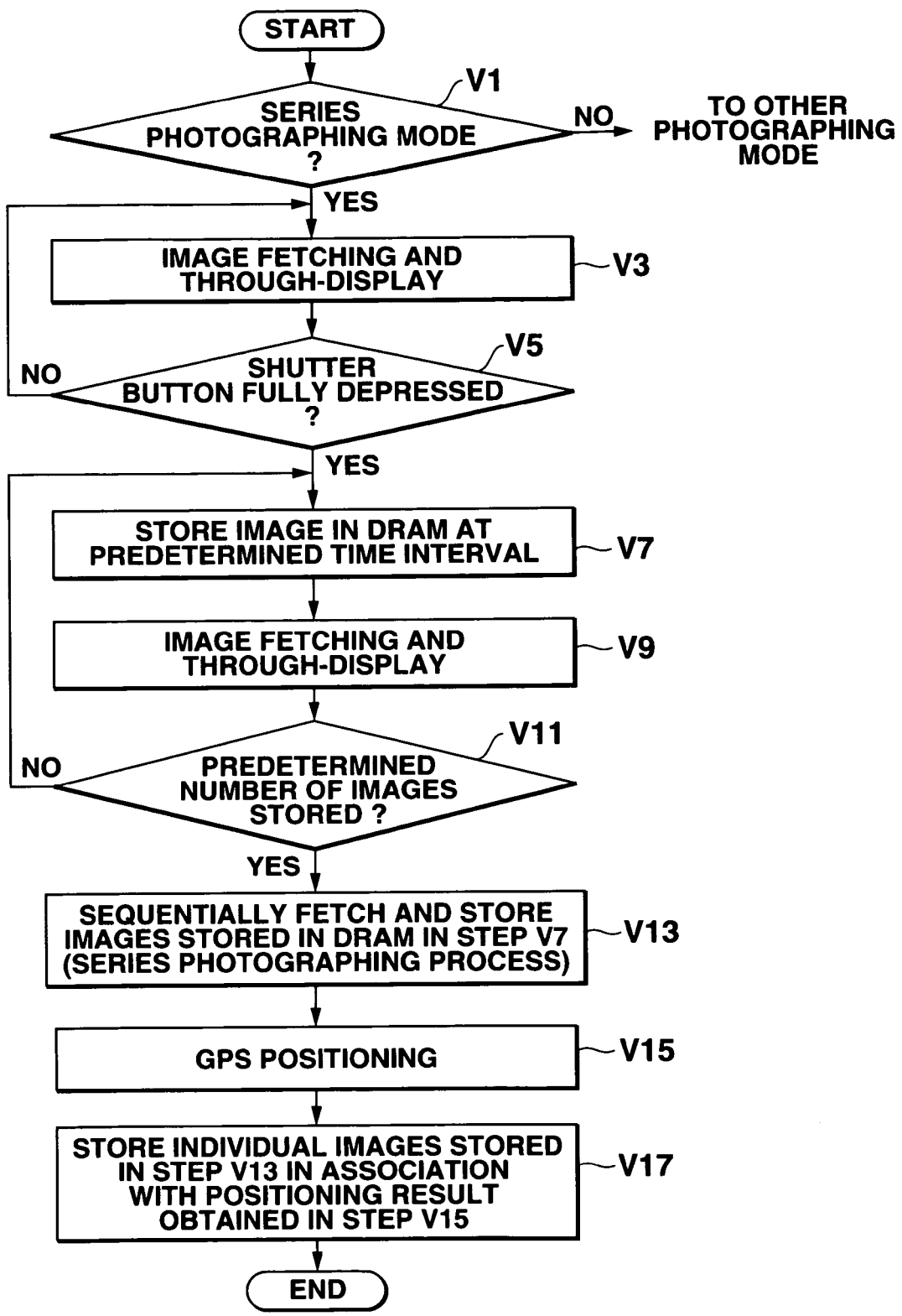
FIG. 25 is a flowchart exemplifying another routine in the case where positioning is executed after series photographing is completed.

FIG. 25 is a flowchart exemplifying another routine in the case where positioning is executed after series photographing is completed. The operation from step V1 to step V9 in FIG. 25 is similar to the operation from step U1 to step U9 in FIG. 24.

In step V11 in FIG. 25, the control section 3 counts the number of images accumulatively stored in the series photographed image memory area 52, and determines that series photographing is completed when the count reaches a predetermined value, then proceeds to step V13. When the count has not reached the predetermined value, the control section 3 returns to step V7.

In the next step V13, the control section 3 performs compression on the individual serially photographed images (image data), stored in the series photographed image memory area 52 in the DRAM 5 in the step V7, one after another, and sequentially stores the compressed image data in the flash memory 6.

Next, the control section 3 sends a control signal (positioning start instruction signal) to the GPS processing section 1 in step V15. When receiving the positioning start instruction signal from the control section 3, the GPS processing section 1 activates the GPS positioning apparatus to execute a reception process on radio waves received via the GPS antenna 1a, computes the local position of the digital camera 100 and sends the positioning result to the control section 3 in step K3. As the GPS processing section 1 proceeds to the next cycle of positioning after completing one cycle of positioning, the control section 3 sends a control signal (positioning end instruction signal) to the GPS processing section 1, when receiving the positioning result from the GPS processing section 1, to prevent the GPS processing section 1 from going to the next cycle and stop positioning.

In the next step V17, the control section 3 stores the positioning result acquired in the step V15 in the flash memory 6 in association with the individual serially photographed images that has been stored in the flash memory 6 in the step V13.

Figure 26:
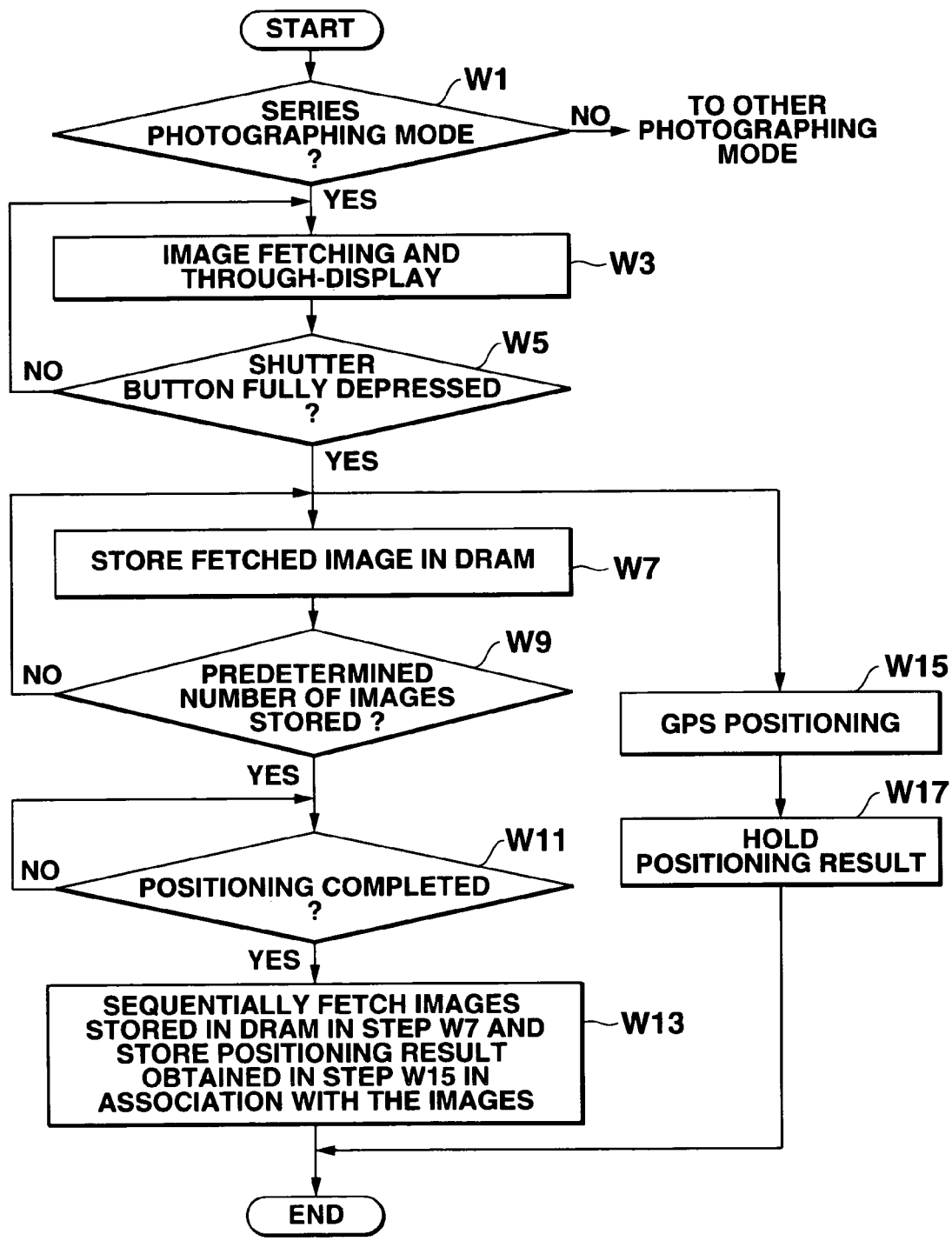
FIG. 26 is a flowchart illustrating a routine in the case where positioning is executed during series photographing.

FIG. 26 is a flowchart illustrating a routine in the case where positioning is executed during series photographing.

In step W1 in FIG. 26 when the photographing mode starts, the control section 3 reads process mode select menu data or the like from the program memory 3c and sends the data to the display section 7 and displays it on the screen, prompting the user to make a selection. The control section 3 checks the state signal sent from the operation section 4. When the detailed function (mode) of the selected processing mode is the photo-graphing mode, the control section 3 goes to step W3.

In step W3, the control section 3 sends a control signal to the image pickup section 2 to fetch a subject image. The image pickup section 2 stores the subject image (image data) into the through image memory area 51 in the DRAM 5 via the optical system. The fetched image is also subjected to through-display on the display section 7.

In the next step W5, the control section 3 checks the state signal sent from the operation section 4. When it is determined that the shutter button 46 has been depressed fully, the control section 3 considers that there is a series photographing instruction and executes step W7 and step W15 in parallel.

In step W7, the control section 3 accumulatively stores the images that are fetched through the image pickup section 2 into the series photographed image memory area 52 at a predetermined time interval. Further, the control section 3 stores the fetched images into the through image memory area 51 and then performs through-display of the images on the display section 7. While steps W7 and W9 are carried out, GPS positioning as illustrated in steps W15 and W17 is executed in parallel.

In step W9, the control section 3 counts the number of images accumulatively stored in the series photographed image memory area 52, and determines that series photographing is completed when the count reaches a predetermined value, then proceeds to step W11. When the count has not reached the predetermined value, the control section 3 returns to step W7 to start the next series photographing operation.

When the digital camera 100 is so designed as to be able to permit a series-photographing release operation during series photographing (e.g., full depression of the shutter button 46 during series photographing), upon detection of the series-photographing release operation, the control section 3 stops accumulative storage of subsequent photographed images and goes to step W11.

The control section 3 waits for GPS positioning (step W15) in the parallel operation to end in step W11, and then proceeds to step W13. Specifically, the control section 3 checks if the positioning result is held in the positioning result memory area in the RAM 3b, and determines that GPS positioning has been completed when the positioning result is held in the positioning result memory area, and then goes to step W13.

When no positioning result is held in the positioning result memory area, on the other hand, the control section 3 waits for the positioning result (computed value) to be sent from the GPS processing section 1 and determines that GPS positioning has been completed upon reception of the positioning result, and sends the positioning end instruction signal to the GPS processing section 1. After the operation in step W15 is completed, the control section 3 goes to step W13. When receiving the positioning result from the GPS processing section 1 at the same time a predetermined number of images are stored in the series photographed image memory area 52 (or the series-photographing release operation is performed) in the step T5, the control section 3 immediately sends the positioning end instruction signal to the GPS processing section 1 and proceeds to step W13 after the operation in step W15 is completed.

In step W13, the control section 3 reads the individual serially photographed images (image data), stored in the series photographed image memory area 52 in the DRAM 5 in the step W7, performs compression on the photographed images one after another and sequentially stores the compressed image data in the flash memory 6. At this time, the positioning result acquired in the step W15 (the positioning result held in the positioning result memory area in the RAM 3b in step W17) is stored in the flash memory 6 in association with each of the serially photographed images.

When the shutter button 46 is fully depressed in step W5, the control section 3 sends a control signal (positioning start instruction signal) to the GPS processing section 1 in step W15. When receiving the positioning start instruction signal from the control section 3, the GPS processing section 1 activates the GPS positioning apparatus to execute a reception process on radio waves received via the GPS antenna 1a, computes the local position (coordinates) of the digital camera 100 and sends the positioning result (computed value) to the control section 3. As the GPS processing section 1 proceeds to the next cycle of positioning after completing one cycle of positioning, the control section 3 sends the positioning end instruction signal to the GPS processing section 1 before preceding to step W17.

In step W17, the control section 3 saves (stores) the positioning result (positioning information), received from the GPS processing section 1, in the positioning result memory area in the RAM 3*b* (or DRAM 5).

The above-described structure can allow positioning to be executed during series photographing and the latest positioning result to be associated with the serially photographed images.

In the example of FIG. 26, positioning is executed in parallel to the photographing operation while a predetermined number of photographed images are stored in the DRAM 5 (or until releasing series photographing is instructed), and after the predetermined number of photographed images are stored there (or releasing series photographing is instructed), the positioning result is stored in association with all the photographed images (serially photographed images). However, positioning may be executed every time a picture is taken and the positioning result may be held in the RAM 3*b* in association with each photographed image, and after a predetermined number of photographed images are stored there (or releasing series photographing is instructed), the individual photographed images and the positioning result associated with those photographed images may be stored. In this case, the latest positioning result can be stored in association with each serially photographed image, so that the latest camera position can be associated with individual images even in the case where the photographing location at the beginning of series photographing differs from the photographing location at the end of series photographing, as in the case of serially taking pictures with a camera in motion such as an on-board camera.

Figure 27:
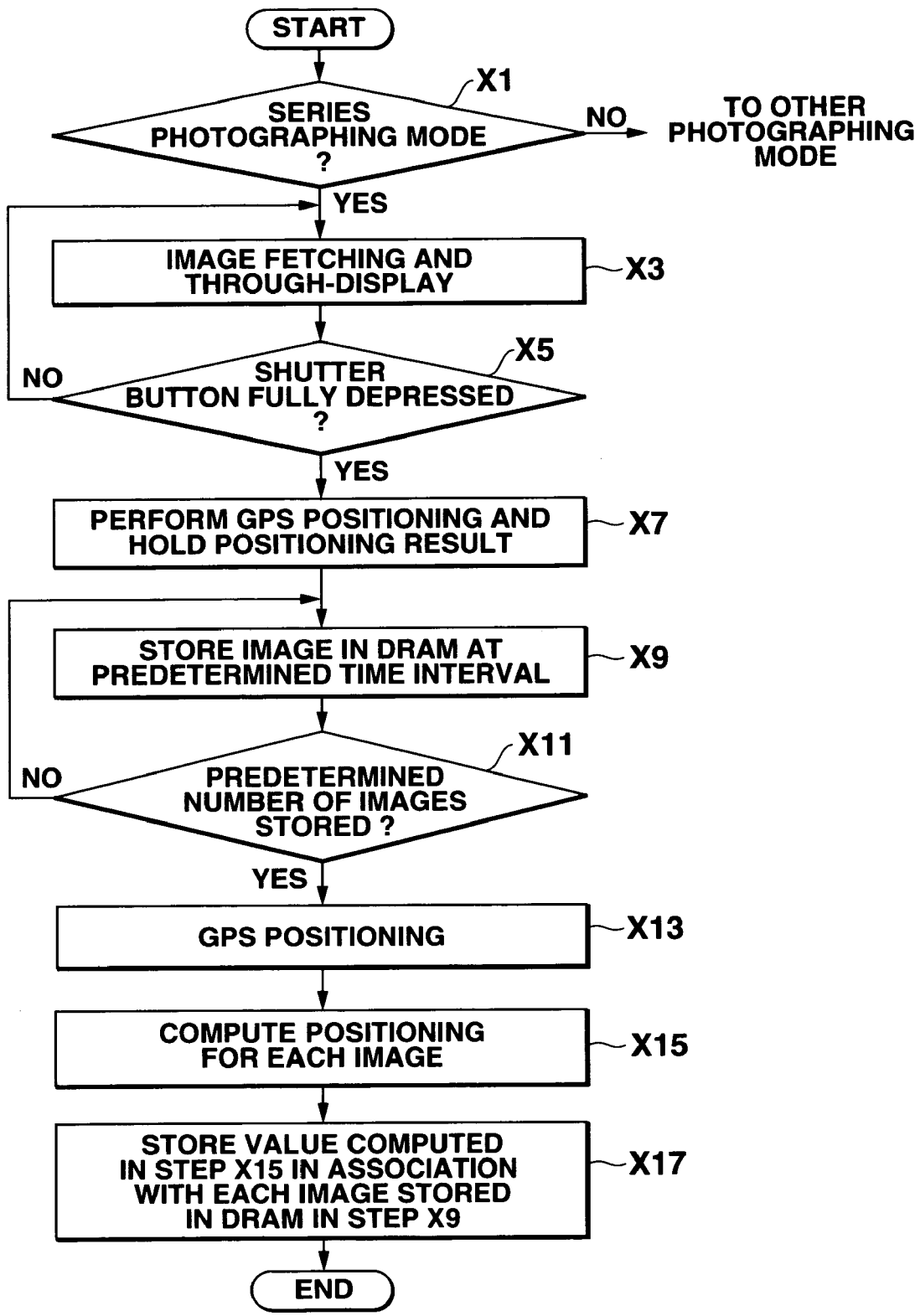
FIG. 27 is a flowchart illustrating a routine in the case where positioning information which is interpolated for each of serially photographed images based on positioning information at the beginning and end of series photographing is adapted.

FIG. 27 is a flowchart illustrating a routine in the case where positioning information which is interpolated for each of serially photographed images based on positioning information at the beginning and end of series photographing is adapted.

In step X1 in FIG. 27, when the photographing mode starts, the control section 3 reads process mode select menu data or the like from the program memory 3*c* and sends the data to the display section 7 and displays it on the screen, prompting the user to make a selection. The control section 3 checks the state signal sent from the operation section 4. When the detailed function (mode) of the selected processing mode is the photo-graphing mode, the control section 3 goes to step X3.

In step X3, the control section 3 sends a control signal to the image pickup section 2 to fetch a subject image. The image pickup section 2 stores the subject image (image data) into the through image memory area 51 in the DRAM 5 via the optical system. The fetched image is also subjected to through-display on the display section 7.

In the next step X5, the control section 3 checks the state signal sent from the operation section 4. When it is determined that the shutter button 46 has been depressed fully, the control section 3 considers that there is a series photographing instruction and proceeds to step X7.

In step X7, the control section 3 sends a control signal (positioning start instruction signal) to the GPS processing section 1. When receiving the positioning start instruction signal from the control section 3, the GPS processing section 1 activates the GPS positioning apparatus to execute a reception process on radio waves received via the GPS antenna 1*a*, computes the local position of the digital camera 100 and sends the positioning result to the control section 3. As the GPS processing section 1 proceeds to the next cycle of positioning after completing one cycle of positioning, the control section 3 sends a control signal (positioning end instruction signal) to the GPS processing section 1, when receiving the positioning result from the GPS processing section 1, to prevent the GPS processing section 1 from going to the next cycle and stop positioning. The control section 3 stores the current positioning result in the positioning result memory area.

In step X9, the control section 3 accumulatively stores the images that are fetched through the image pickup section 2 into the series photographed image memory area 52 at a predetermined time interval. Further, the control section 3 stores the fetched images into the through image memory area 51 and then performs through-display of the images on the display section 7.

In step X11, the control section 3 counts the number of images accumulatively stored in the series photographed image memory area 52, and determines that series photographing is completed when the count reaches a predetermined value, then proceeds to step X13. When the count has not reached the predetermined value, the control section 3 returns to step X9 to start the next series photographing operation.

When the digital camera 100 is so designed as to be able to permit a series-photographing release operation during series photographing (e.g., full depression of the shutter button 46 during series photographing), upon detection of the series-photographing release operation, the control section 3 stops accumulative storage of subsequent photographed images and goes to step X13.

In step X13, the control section 3 sends a control signal (positioning start instruction signal) to the GPS processing section 1. When receiving the positioning start instruction signal from the control section 3, the GPS processing section 1 activates the GPS positioning apparatus to execute a reception process on radio waves received via the GPS antenna 1*a*, computes the local position of the digital camera 100 and sends the positioning result to the control section 3. As the GPS processing section 1 proceeds to the next cycle of positioning after completing one cycle of positioning, the control section 3 sends a control signal (positioning end instruction signal) to the GPS processing section 1, when receiving the positioning result from the GPS processing section 1, to prevent the GPS processing section 1 from going to the next cycle and stop positioning.

In step X15, the control section 3 computes an estimated photographing location (coordinates) of each of serially photographed images based on the positioning result at the beginning of series photographing, held in the step X7, and the positioning result at the end of series photographing, acquired in the step 13. The following shows how to compute the estimated photographing location.

Given that the number of serially photographed images N=16, the photographing location at the beginning of series photographing is (X1, Y1) and the photographing location at the end of series photographing is (X16, Y16), then an interpolated value in the X direction, $\Delta/x$, and an interpolated value in the Y direction, $\Delta y$, become as follows.

$\Delta x = |X1 - X16| \div 15$ $\Delta y = |Y1 - Y16| \div 15$

From those equations, the photographing locations of the first, second, third, . . . , fifteenth and sixteenth serially photographed images can be obtained as (X1, Y1), (X1+Δx, Y1+Δy), (X1+2Δx, Y1+2Δy), (X1+14Δx, Y1+14Δy) and (X16, Y16). If an error is negligible, (X16, Y16)=(X1+15Δx, Y1+15Δy). It is to be noted however that if Δx<α and Δy<β (α and β being predetermined (lower) values), Δx=0 and Δy=0.

In step X17, the control section 3 performs compression on the individual serially photographed images (image data), stored in the series photographed image memory area 52 in the DRAM 5 in the step Y9, one after another, and sequentially stores the compressed image data in the flash memory 6 as serially photographed images. At this time, the positional information (coordinates) computed in the aforementioned step X15 is stored in association with each of the serially photographed images.

With the above-described structure, positioning information interpolated for each serially photographed image based on positioning information at the beginning and end of series photographing can be adapted. Therefore, an estimated photographing location can be associated with each image even in the case where the photographing location at the beginning of series photographing differs from the photographing location at the end of series photographing, as in the case of serially taking pictures with a camera in motion in responsive to a moving subject or the case of serially taking pictures with an on-board camera.

Although the number of interpolated values equals to the number of serially photographed images in the foregoing description, interpolated values which are less in number than serially photographed images, e.g., only one interpolated value, may be computed and stored in association with the individual serially photographed images.

Although the GPS processing section 1 proceeds to the next cycle of positioning after sending the positioning result (computed value) to the control section 3, the structure may be modified so that when one cycle of positioning is performed and the positioning result is sent to the control section 3, the positioning process is be interrupted or it is stopped until an instruction is given from the control section 3.

Although the foregoing description has been given of the positioning timing control operation or the like in the series photographing mode, this invention is also adaptable to a quick shot mode which can ensure photographing by the number of shutter operations (there is an upper limit) that are performed within a predetermined time.

Although coordinates (longitude, latitude) are used as positional information (positioning information) and are associated with each of serially photographed images, a place name, a facility name or the like according to coordinates may be stored as positional information in association with each serially photographed image.

Further, the digital camera 100 may be equipped with a communication interface and communication capability, so that the positioning result (computed value) stored data can be transmitted to an external device over a communication network, such an Internet.

Furthermore, the photographing instruction means is not limited to the shutter of the camera, but may be operable in responsive to a remote operation via a remote controller or a communication line (radio communication line).

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A camera comprising:
photographing means having a series photographing capability for acquiring image data of a subject;
positioning means for executing positioning to obtain positional information;
series photographing instruction means for giving a series photographing instruction to said photographing means to carry out series photographing;
series photographing control means for performing such control as to cause said photographing means to execute series photographing to acquire a plurality of photographed images in response to said series photographing instruction given by said series photographing instruction means;
first positioning timing control means for controlling said timing in such a way that said positioning means executes positioning to acquire first positional information before or immediately after said series photographing instruction is given by said series photographing instruction means;
second positioning timing control means for controlling said timing in such a way that said positioning means executes positioning to acquire second positional information immediately before or immediately after series photographing by said series photographing control means is finished;
positional information computing means for computing new positional information using said first and second positional information; and
memory control means for storing said positional information computed by said positional information computing means in said memory means in association with said plurality of photographed images acquired by said series photographing control means.

2. A camera comprising:
a photographing device having a series photographing capability which acquires image data of a subject;
a positioning device which executes positioning to obtain positional information;
a series photographing instruction device which provides a series photographing instruction to said photographing device to carry out series photographing;
a series photographing controller which performs such control as to cause said photographing device to execute series photographing to acquire a plurality of photographed images in response to said series photographing instruction given by said series photographing instruction device;
a first positioning timing controller which controls said timing in such a way that said positioning device executes positioning to acquire first positional information before or immediately after said series photographing instruction is given by said series photographing instruction device;
a second positioning timing control device which controls said timing in such a way that said positioning device executes positioning to acquire second positional information immediately before or immediately after series photographing by said series photographing control device is finished;

a positional information computing device which computes new positional information using said first and second positional information;

a memory which stores said plurality of photographed images acquired under control of said series photographing controller; and a memory controller which stores said positional information obtained by said positioning device in said memory in association with said plurality of photographed images acquired by said photographing device, wherein said memory controller stores said positional information computed by said positional information computing device in said memory in association with said plurality of photographed images acquired by said series photographing controller.

3. A camera comprising:

photographing means;

positioning means;

positioning timing control means for causing said positioning means to execute positioning at a predetermined timing asynchronous to a photographing timing of said photographing means to thereby obtain positional information;

memory means for storing a plurality of images photographed by said photographing means; and memory control means for storing said positional information obtained by said positioning timing control means in said memory means in association with said plurality of photographed images, wherein said predetermined timing for obtaining said positional information is when a date is changed.

4. A camera comprising:

photographing means;

positioning means;

positioning timing control means for causing said positioning means to execute positioning at a predetermined timing asynchronous to a photographing timing of said photographing means to thereby obtain positional information;

memory means for storing a plurality of images photographed by said photographing means; and memory control means for storing said positional information obtained by said positioning timing control means in said memory means in association with said plurality of photographed images, wherein said predetermined timing for obtaining said positional information is when a folder for storing an image photographed by said photographing means is changed or newly provided.

5. A camera comprising:

positioning timing determination means for determining a positioning timing under a predetermined condition;

positioning means for executing positioning at the positioning timing determined by the positioning timing determination means to thereby acquire positional information;

instruction means for receiving a photographing instruction at an arbitrary timing;

image storing means for storing a photographed image in accordance with the photographing instruction received by the instruction means;

positional information storing means for storing the positional information acquired by the positioning means in association with the photographed image stored by the image storing means;

overlapping determination means for determining whether the positioning timing determined by the positioning timing determination means and the timing of receiving the photographing instruction by the instruction means overlap, in accordance with the photographing instruction received by the instruction means, first control means for, if the overlapping determination means determines that the timings overlap when the image storing means stores the photographed image in accordance with the photographing instruction received by the instruction means, allowing the image storing means to store the photographed image after inhibiting the positioning means from executing positioning at the overlapped positioning timing; and second control means for, if the overlapping determination means determines that the timings do not overlap when the image storing means stores the photographed image in accordance with the photographing instruction received by the instruction means, allowing the image storing means to immediately store the photographed image without inhibiting the positioning means from executing positioning at the overlapped positioning timing.

6. The camera according to claim 5, wherein:

the positioning timing determination means determines a plurality of positioning timings;

the positioning means executes positioning at the plurality of positioning timings determined by the positioning timing determination means to thereby acquire a plurality of positional information items; and the positional information storing means stores a positional information item selected from positional information items acquired by the positioning means without being inhibited by the control means, in association with the photographed image stored by the image storing means.

7. The camera according to claim 6, wherein the positional information storing means stores the positional information acquired at a positioning timing closest to a timing at which the image is photographed, of the plurality of positional information items acquired by the positioning means, in association with the photographed image.

8. The camera according to claim 6, wherein the positioning timing determination means determines the plurality of positioning timings repeated at each predetermined time interval.

9. The camera according to claim 6, wherein the positioning time determination means determines, as the positioning timing, a timing coming after a predetermined time passes in a state that the photographing instruction received by the instruction means is not received.

10. The camera according to claim 5, further comprising:

selection means for selecting one of a positioning operation by the positioning means and a photographing operation by the image storing means which has a high priority, wherein the control means inhibits the positioning means from executing the positioning operation at the overlapped positioning timings, when the positioning timing determined by the positioning timing determination means and the timing of receiving the photographing instruction by the instruction means overlap, and the photographing operation is selected by the selection means.

11. The camera according to claim 5, wherein the positioning timing determination means determines, as the positioning timing, a timing which is determined irrespective of the timing of receiving the photographing instruction by the instruction means and which is out of a period from the timing of the photographing instruction to a time when the photographed image is stored.

12. The camera according to claim 5, wherein the positioning timing determination means determines, as the positioning timing, a timing at which a photographing mode is turned on or a timing at which the photographing mode is turned off.

13. A camera comprising:
positioning timing determination means for determining a predetermined positioning timing;
positioning means for executing positioning at the Positioning timing determined by the positioning timing determination means to thereby acquire positional information;
instruction means for receiving a photographing instruction at an arbitrary timing;
image storing means for storing a photographed image in accordance with the photographing instruction received by the instruction means;
positional information storing means for storing the positional information acquired by the positioning means in association with the photographed image stored by the image storing means;
selection means for selecting one of a positioning operation by the positioning means and a photographing operation by the image storing means which has a high priority; and
control means for inhibiting the image storing means from storing the photographed image during a period until the positioning of the positioning means is ended, when the positioning timing determined by the positioning timing determination means and the timing of receiving the photographing instruction by the instruction means overlap and when the positioning operation of the positioning means is selected with higher priority by the selection means.

14. A camera method comprising the steps of:
determining a positioning timing under a predetermined condition;
executing positioning at the determined positioning timing to thereby acquire positional information;
receiving a photographing instruction at an arbitrary timing;
storing a photographed image in accordance with the received photographing instruction;
storing the acquired positional information in association with the stored photographed image;
determining whether the positioning timing and the timing of receiving the photographing instruction overlap, in accordance with the received photographing instruction,
if a determination is made that the timings overlap when the photographed image is stored in accordance with the received photographing instruction, allowing the photographed image to be stored after inhibiting execution of positioning at the overlapped positioning timing; and
if a determination is made that the timings do not overlap when the photographed image is stored in accordance with the received photographing instruction, allowing the photographed image to be immediately stored without inhibiting execution of positioning at the overlapped positioning timing.

15. A camera method comprising the steps of:
determining a predetermined positioning timing;
executing positioning at the predetermined positioning timing to thereby acquire positional information;
receiving a photographing instruction at an arbitrary timing;
storing a photographed image in accordance with the received photographing instruction;
storing the acquired positional information in association with the stored photographed image;
selecting one of a positioning operation and a photographing operation to have a higher priority; and
inhibiting execution of photographing during a period until the positioning has ended, when the determined positioning timing and the timing of receiving the photographing instruction overlap and when the positioning operation is selected with higher priority.

* * * * *